US010266442B2

(12) United States Patent
Klein et al.

(10) Patent No.: US 10,266,442 B2
(45) Date of Patent: *Apr. 23, 2019

(54) METHODS AND APPARATUS FOR ADDITIVE MANUFACTURING OF GLASS

(71) Applicant: Massachusetts Institute of Technology, Cambridge, MA (US)

(72) Inventors: John Klein, Boston, MA (US); Giorgia Franchin, Padua PD (IT); Michael Stern, Cambridge, MA (US); Markus Kayser, Cambridge, MA (US); Chikara Inamura, Somerville, MA (US); Shreya Dave, Cambridge, MA (US); Neri Oxman, Cambridge, MA (US); Peter Houk, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,167

(22) Filed: Jan. 23, 2018

(65) Prior Publication Data

US 2018/0148364 A1 May 31, 2018

Related U.S. Application Data

(63) Continuation of application No. 15/365,577, filed on Nov. 30, 2016, now Pat. No. 9,896,368, which is a (Continued)

(51) Int. Cl.
*C03B 19/00* (2006.01)
*B33Y 10/00* (2015.01)
(Continued)

(52) U.S. Cl.
CPC .............. *C03B 19/00* (2013.01); *B33Y 10/00* (2014.12); *B33Y 30/00* (2014.12); *B33Y 40/00* (2014.12);
(Continued)

(58) Field of Classification Search
CPC ............ C03B 19/00; C03B 17/00; C03B 7/12; C03B 17/025; C03B 17/04; C03B 19/02;
(Continued)

(56) References Cited

U.S. PATENT DOCUMENTS 2,047,173 A 7/1936 Bates
3,293,017 A * 12/1966 Jenkins ................. C03B 5/0336
65/122

(Continued)

FOREIGN PATENT DOCUMENTS

CN 103073174 A 5/2013
CN 103395973 A 11/2013
(Continued)

OTHER PUBLICATIONS

Fateri, M., et al., 2012, On-Site Additive Manufacturing by Selective Laser Melting of Composite Objects. Concepts and Approaches for Mars Exploration, held Jun. 12-14, 2012 in Houston, Texas. LPI Contribution No. 1679, id.4368.

(Continued)

*Primary Examiner* — Joseph S Del Sole
*Assistant Examiner* — Mohamed K Ahmed Ali
(74) *Attorney, Agent, or Firm* — Stephen R. Otis

(57) ABSTRACT

In illustrative implementations of this invention, a crucible kiln heats glass such that the glass becomes or remains molten. A nozzle extrudes the molten glass while one or more actuators actuate movements of the nozzle, a build platform or both. A computer controls these movements such that the extruded molten glass is selectively deposited to form a 3D glass object. The selective deposition of molten glass occurs inside an annealing kiln. The annealing kiln anneals the glass after it is extruded. In some cases, the actuators actuate the crucible kiln and nozzle to move in horizontal x, y directions and actuate the build platform to (Continued)

move in a z-direction. In some cases, fluid flows through a cavity or tubes adjacent to the nozzle tip, in order to cool the nozzle tip and thereby reduce the amount of glass that sticks to the nozzle tip.

16 Claims, 19 Drawing Sheets

Related U.S. Application Data continuation of application No. 14/697,564, filed on Apr. 27, 2015, now abandoned.

(60) Provisional application No. 61/984,137, filed on Apr. 25, 2014.

(51) Int. Cl.
| | |
|---|---|
| B33Y 30/00 | (2015.01) |
| B33Y 40/00 | (2015.01) |
| C03B 17/00 | (2006.01) |
| C03B 17/02 | (2006.01) |
| C03B 17/04 | (2006.01) |
| C03B 19/02 | (2006.01) |
| C03B 25/02 | (2006.01) |
| C03B 3/00 | (2006.01) |
| C03B 5/02 | (2006.01) |
| C03B 5/033 | (2006.01) |
| C03B 5/26 | (2006.01) |
| C03B 7/088 | (2006.01) |
| C03B 7/094 | (2006.01) |
| C03B 7/098 | (2006.01) |
| C03B 7/12 | (2006.01) |
| B29C 64/106 | (2017.01) |

(52) U.S. Cl.
CPC ............... *C03B 3/00* (2013.01); *C03B 5/021* (2013.01); *C03B 5/0334* (2013.01); *C03B 5/0336* (2013.01); *C03B 5/26* (2013.01); *C03B 7/088* (2013.01); *C03B 7/094* (2013.01); *C03B 7/098* (2013.01); *C03B 7/12* (2013.01); *C03B 17/00* (2013.01); *C03B 17/025* (2013.01); *C03B 17/04* (2013.01); *C03B 19/02* (2013.01); *C03B 25/02* (2013.01); *B29C 64/106* (2017.08)

(58) Field of Classification Search
CPC ....... C03B 5/0334; C03B 5/0336; C03B 5/26; C03B 5/021; B33Y 30/00; B33Y 40/00; B33Y 10/00; B29C 64/106

USPC ............ 65/72, 122, 127, 129, 146, 164, 326
See application file for complete search history.

(56) References Cited

U.S. PATENT DOCUMENTS

| | | | |
|---|---|---|---|
| 4,682,995 | A | 7/1987 | Clasen |
| 4,684,385 | A | 8/1987 | Clasen |
| 4,816,051 | A | 3/1989 | Clasen |
| 4,888,036 | A | 12/1989 | Clasen |
| 5,121,329 | A | 6/1992 | Crump |
| 5,402,351 | A | 3/1995 | Batchelder et al. |
| 5,741,557 | A | 4/1998 | Corbin et al. |
| 6,722,872 | B1 | 4/2004 | Swanson et al. |
| 8,070,473 | B2 | 12/2011 | Kozlak |
| 8,215,371 | B2 | 7/2012 | Batchelder |
| 2002/0002843 | A1 | 1/2002 | Gotoh et al. |
| 2009/0314391 | A1 | 12/2009 | Crump et al. |
| 2013/0000549 | A1 | 1/2013 | Hartmann |
| 2013/0306198 | A1 | 11/2013 | Prest et al. |
| 2014/0265034 | A1 | 9/2014 | Dudley |

FOREIGN PATENT DOCUMENTS

| | | |
|---|---|---|
| CN | 103524022 A | 1/2014 |
| CN | 203419844 U | 2/2014 |
| CN | 203513482 U | 4/2014 |

OTHER PUBLICATIONS

Joris, Apr. 14, 2010, You can now 3D print in glass with Shapeways. Posted on Apr. 14, 2010 on Shapeways, What's Hot. Accessed on Jun. 3, 2015 at http://www.shapeways.com/blog/archives/401-you-can-now-3D-print-in-glass-with-Shapeways.html.
Klein, S., et al., 2012, 3D Printing of Transparent Glass. HP Laboratories, HPL-2012-198.
Luo, J., et al., Oct. 24, 2014, Additive Manufacturing of Glass. Journal of Manufacturing Science and Engineering, vol. 136, Issue 6, 061024, six pages (Oct. 24, 2014).
Author Unknown, 2005, The Glass Transition. Polymer Science Learning Center, Department of Polymer Science, The University of Southern Mississippi, 2005. Accessed on Jun. 3, 2015 at http://pslc.ws/macrog/tg.htm.
Trevarthan, et al., 2012, Molten Glass. RepRap Forum, Dec. 21, 2012. Accessed on Jun. 3, 2015 at http://forums.reprap.org/read.php?1,172516,172520.
Ganter, et al., Vitraglyphic—3D Printing in Glass. Date: Jun. 2010 or earlier. Accessed on Jun. 3, 2015 at http://depts.washington.edu/open3dp/2009/10/vitraglyphic-3d-printing-in-glass/.
Whisnant, D., 2000, Polymer Chemistry the Glass Transition. Last updated Jul. 11, 2000. Accessed on Jun. 3, 2015 at http://faculty.uscupstate.edu/llever/Polymer%20Resources/GlassTrans.htm.

\* cited by examiner

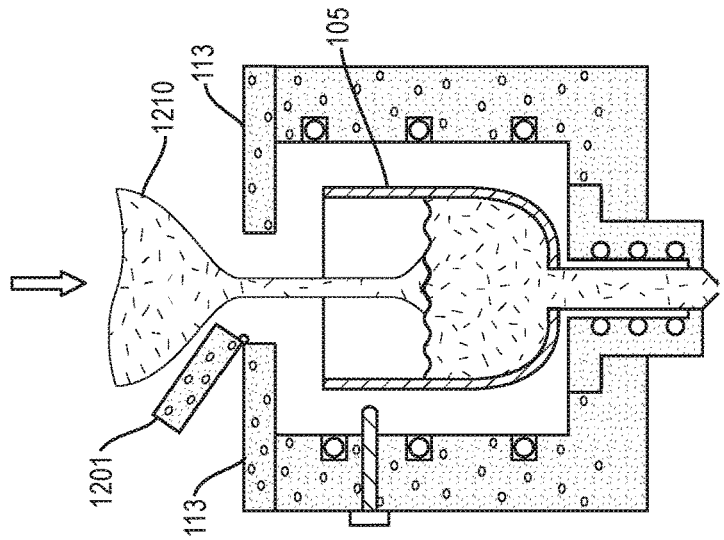
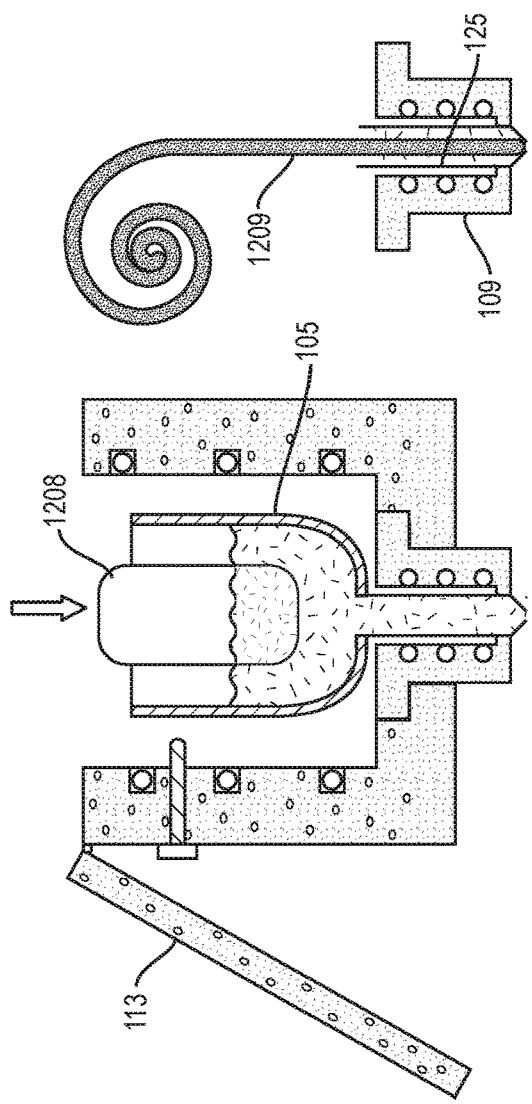
FIG. 12D   FIG. 12E   FIG. 12F

METHODS AND APPARATUS FOR ADDITIVE MANUFACTURING OF GLASS

RELATED APPLICATIONS

This application is a continuation of U.S. patent application Ser. No. 15/365,577 filed Nov. 30, 2016, which is a continuation of U.S. patent application Ser. No. 14/697,564 filed Apr. 27, 2015, which claims the benefit of U.S. Provisional Application No. 61/984,137 filed Apr. 25, 2014.

FIELD OF TECHNOLOGY

The present invention relates generally to additive manufacturing of glass, by extrusion of molten glass through a nozzle.

SUMMARY

In illustrative implementations of this invention, a crucible kiln heats glass such that the glass becomes or remains molten. A nozzle extrudes the molten glass while one or more actuators actuate movements of the nozzle, a build platform or both. A computer controls these movements such that the extruded molten glass is selectively deposited to form a 3D glass object.

In some implementations, the actuators actuate the crucible kiln and nozzle to move in horizontal x, y directions and actuate the build platform to move in a z-direction. In other implementations, "polar printing" occurs in which motion occurs in linear r, angular theta, and linear z directions: the actuators (a) actuate the crucible kiln and nozzle to move along a single horizontal "r" axis; (b) actuate the build platform to rotate about its center line in an angular theta direction, and (c) actuate the build platform to move up and vertically in a z direction. In yet other implementations, the nozzle and crucible kiln are stationary, and the actuators actuate the build platform to move relative to the nozzle.

In illustrative implementations, the nozzle is independently heated by a nozzle kiln. In some cases, the nozzle kiln is partially housed in the crucible kiln, and partially protrudes below the crucible kiln.

In illustrative implementations, the build platform is located inside an annealing kiln, and the nozzle protrudes into the annealing kiln. Thus, the selective deposition of molten glass occurs inside the annealing kiln. The annealing kiln heats the extruded glass during the selective deposition, and anneals the glass by slowly and progressively lowering the temperature of the extruded glass after the selective deposition.

In some implementations, a fluid flows through a cavity or tubes adjacent to the nozzle tip, in order to cool the nozzle tip and thereby reduce the amount of glass that sticks to the nozzle tip. The lower the temperature of the nozzle tip, the less glass sticks to the nozzle tip or the easier it is to remove it.

In some implementations, one or more refractory metal sheets are press-formed to fit around the exit orifice of the nozzle and thereby protect the nozzle tip from becoming clogged by glass. When glass becomes stuck to a disposable sheet, the disposable sheet is removed.

In some implementations, a valve controls flow of molten glass through the nozzle. For example, in some cases, the valve comprises a pair of refractory shears. When the shears are closed, they cut the filament of molten glass exiting the nozzle and block flow of molten glass through the nozzle. In other cases, a motor raises a rod up and down. When the rod is fully lowered, it extends into the nozzle, touching interior walls of the nozzle tip and blocking flow of molten glass through the nozzle.

In some implementations, the sole impetus for the flow of molten glass through the nozzle is the force of gravity. In other implementations, molten glass is actively pushed out of the nozzle. For example, in some cases, a refractory plunger or compressed air exerts pressure against molten glass in the crucible and thereby pushes the molten glass through the nozzle.

In some cases, a tube extends into the nozzle almost to the tip of the nozzle. Air is blown through the tube, such that a column of air infiltrates the filament of molten glass as it is extruded from the nozzle. The column of air is trapped inside the filament and is co-axial with the filament.

In illustrative implementations, the 3D glass object produced by the selective deposition is optically transparent.

The description of the present invention in the Summary and Abstract sections hereof is just a summary. It is intended only to give a general introduction to some illustrative implementations of this invention. It does not describe all of the details and variations of this invention. Likewise, the descriptions of this invention in the Field of Technology section and Field Of Endeavor section are not limiting; instead they identify, in a general, non-exclusive manner, a field of technology to which exemplary implementations of this invention generally relate. Likewise, the Title of this document does not limit the invention in any way; instead the Title is merely a general, non-exclusive way of referring to this invention. This invention may be implemented in many other ways.

BRIEF DESCRIPTION OF THE DRAWINGS

FIGS. 12A, 12B, 12C, 12D, 12E and 12F each show material being fed into the printer.

FIG. 14A is a cross-sectional view that shows multiple internal cavities. FIG. 14B shows multiple, distinct layers of optically transparent glass. FIG. 14C shows a spiral filament of glass. FIG. 14D is a cross-sectional view of an elongated cavity in the spiral filament.

Figure 1A:
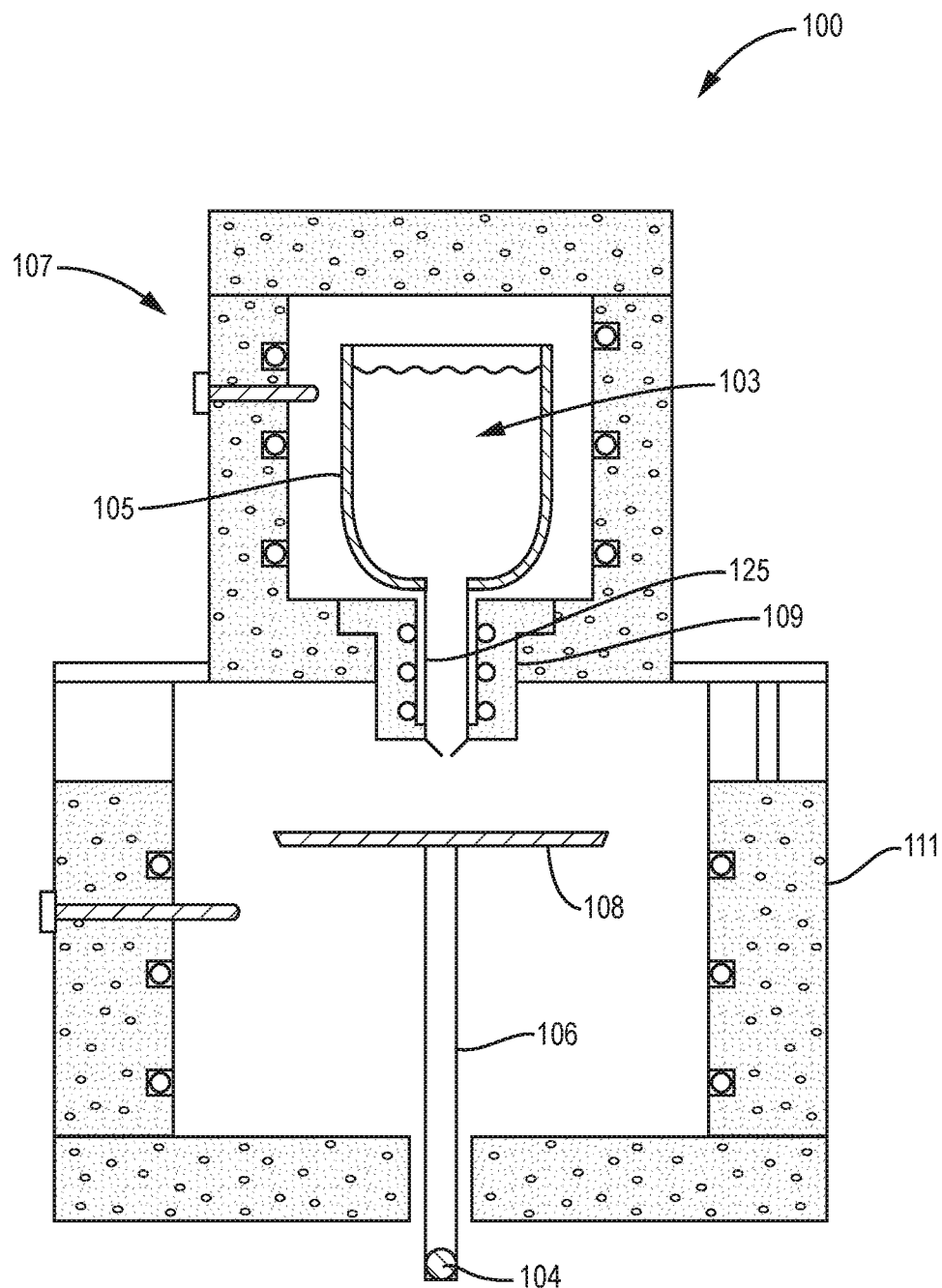
FIG. 1A is a cross-sectional view of an apparatus for additive manufacture of glass.

The above Figures show some illustrative implementations of this invention, or provide information that relates to those implementations. However, this invention may be implemented in many other ways.

DETAILED DESCRIPTION

Prototype

The following is a description of a prototype of this invention. This prototype is a non-limiting example of this invention; this invention may be implemented in many other ways.

In this prototype, a 3D printer fabricates 3D glass objects, such as objects that comprise optically transparent glass. The 3D printer operates at high temperatures, extrudes highly viscous molten glass, and overcomes large inertias during the 3D printing process.

In this prototype, a crucible kiln maintains molten glass at a temperature of 1900-2000 degrees Fahrenheit. The temperature of the feed affects the dimensional accuracy of the print due to the change in viscosity across the temperature range. Electrical specifications of the crucible kiln are: 1800 W, 120V, 15 A, 1 phase, 20 A breaker. The kiln is made of alumina-silica fiber board (Duraboard®) and it is heated through Kanthal® A-1 1.8 mm diameter, 0.57 Resistance $\Omega \cdot m$ 20° C. coils. Temperature of the crucible kiln is read by a Type K thermocouple.

In this prototype, a nozzle kiln provides independent heating to the printer nozzle. The electrical specifications of the nozzle kiln are: 300 W, 48V, 6 A, 1 phase, 15 A breaker. The kiln is made of alumina-silica fiber board (Duraboard®) and it is heated through Kanthal® A-1 1 mm diameter, 1.85 Resistance $\Omega \cdot m$ 20° C. coils. Temperature of the nozzle kiln is read by a Type S thermocouple. The characteristics of the flow of molten glass are highly temperature dependent. The nozzle kiln is partially housed in a bottom wall of the crucible kiln, and also protrudes below the bottom of the crucible kiln.

In this prototype, the crucible, crucible kiln, nozzle and nozzle kiln together comprise a compact unit, which is sometimes referred to herein as the "print head". All heating elements and thermocouples exit on the same side of the print head in order not to limit the print head movements.

In this prototype, molten glass is contained in a refractory crucible positioned inside the crucible kiln. The molten glass flows out of the crucible, then through an alumina nozzle, and then exits the tip of the nozzle and is deposited. The nozzle kiln has a hole, into which the nozzle is inserted. After the nozzle is inserted, the crucible and the nozzle are assembled with a refractory mortar. The nozzle is machined from bulk alumina rods.

In this prototype, the print head (including nozzle, crucible, crucible kiln and nozzle kiln) is mounted on a carriage that comprises supports mounted on roller bearings that travel on structural tracks. The nozzle kiln and nozzle protrude out of the bottom of the crucible kiln, and thus protrude below the carriage into the annealing chamber. The nozzle deposits molten glass, precisely controlling layer height. The layers of deposited glass adhere to each other.

In this prototype, the molten glass is deposited into an annealing chamber. Thus, the 3D object formed by the deposited glass is created inside the annealing chamber. The annealing chamber reduces the cooling rate of the glass, such that the 3D object being manufactured comprises crack-free glass with strong adhesion between layers.

In this prototype, the annealing chamber operates at 900 degrees Fahrenheit, before slowly cooling during annealing. The annealing chamber remains stationary. A build platform supports the 3D glass object being fabricated. The build platform is positioned inside the annealing chamber. An actuator moves the build platform up and down vertically. The print head moves horizontally in X-Y directions.

In this prototype, the heating elements of the annealing chamber draw 4000 Watts. Power for the heating elements is obtained by plugging into a 208 V wall outlet. The annealing chamber includes two refractory doors. One door provides access to the nozzle. The other door may be opened, in order to remove the 3D printed object from the annealing chamber. In addition, the annealing chamber includes a heat-resistant Neoceram® window, through which a user may look to visually monitor progress of a print job.

In this prototype, the top of the annealing kiln has a hole, into which the nozzle of the print head protrudes in order to deposit molten glass into the annealing chamber. Two light, thin, refractory Duraboard® insulation skirts, together with the carriage for the print head, block this hole and reduce the amount of heat that is lost through this hole. One skirt is mounted on top of the annealing chamber, whereas the other one is mounted to the moving carriage below the crucible kiln.

In this prototype, a frame provides structural support for the printer, and is positioned along the exterior of the printer. The frame is made from 80/20 aluminum 1" stock and 1018, 1" square steel tube. Aluminum is used for elements not exposed to high heat, while the heavier steel is reserved for central components that may become hot from the feed kiln, annealing kiln, or radiating molten glass. The print head is mounted on a moveable carriage. The carriage comprises steel supports mounted on shielded roller bearings that travel on structural steel tracks. The entire assembly, including the frame, print head, carriage, and annealing chamber, fits through a standard door frame.

This prototype includes three independent stepper motor-lead screw gantry systems. Out of these three stepper motor-lead screw gantry systems, one actuates x motion of the print head carriage, one actuates y motion of the print head carriage, and one actuates z motion of the build carriage.

In this prototype, each stepper motor is electronically controlled by a driver circuit, which in turn is electronically controlled by an Arduino® PCB and an Arduino® Shield PCB. The stepper motors are NEMA 23 in size and have a rated holding torque of 400 oz-inches. The stepper motors operate in their high-torque range due to the inertia of the crucible kiln and carriage assembly. The driver circuits permit a maximum current of 7.8 Amps to the stepper motors and are powered separately from the electronic controls with a 48 V power supply.

In this prototype, each of the x and y motors are connected to an ACME ½-10 five-start fast travel lead screw with a flexible helical coupling that accommodates slight misalignments during operation. The x and y motors are isolated from axial and radial loads by bearing blocks. Each of the x and y motors is mounted at the corner of the travel range actuated by the motor. The lead screws for the x and y motors, respectively, are attached to the carriage with a brass nut and the far end is not constrained in order to reduce risk of jamming due to substantial vibration when operating at full speeds. Plates and mounts are made of mild steel.

In this prototype, the Z motor is mounted at the base of the frame and drives a standard travel lead screw through radial bearings to the build platform. The build platform support rod extends through a hole at the base of the annealing chamber kiln.

In this prototype, an emergency stop button is wired to cut power to the drivers and motors and mounted to the frame for easy access. Limit switches are mounted at the "zeros" of the X and Y axes both to provide homing information to the control software and to protect the system from mechanical crashes. These prevent the motor from driving when activated and are connected directly to the Arduino® shield. The limit switch cables are bundled separately from the motor cables to prevent interference.

In this prototype, a computer slices a CAD model of the desired three-dimensional glass object. To do so, the computer performs a C# script in Grasshopper Build 0.9.76.0, and imported into an open source printing software, Repetier-Host V1.0.6. Open source Repetier firmware is used to direct the 3D printer. The Repetier firmware is adapted for the acceleration, velocities, and size of the 3D printer.

In this prototype, a computer performs an algorithm that includes the following steps. The slicing script draws a helix around the CAD model structure, providing information for continuous flow and accommodating for the specific filament diameter of extruded glass. This helix is then represented in Cartesian coordinates in the form of g-code. The g-code generator may take two different types of inputs to create the code: a free-form spline/polyline curve or a non-uniform rational basis spline (nurbs) surface. The layer height and curve discretization, as well as the feed rate, may be modified in real-time, while watching the toolpath update live in the preview pane. Users may also define specific velocities for each point. The algorithm for the wrapping toolpath takes the input surface, intersects it based on the layer height, discretizes each intersection curve based on the input resolution, and then incrementally remaps the discretized points with increasing z values. The remapped points are then connected with a polyline to create the continuous wrapping toolpath for any given complex geometry. All remapped points are ordered and formatted to g-code syntax which is then be imported directly into Repetier software.

In this prototype, the 3D printer selectively deposits molten glass with a spatial precision of about 2 mm. The crucible kiln, nozzle kiln and annealing kiln are able to heat up to 2300° F., and the maximum build volume is 0.7 cubic feet.

This invention is not limited to the prototype described above. Instead, this invention may be implemented in many different ways.

Drawings

Turning now to the drawings, FIG. 1A is a cross-sectional view of an apparatus 100 for additive manufacture of glass, in an illustrative implementation of this invention. In FIG. 1A, a crucible kiln 107 heats glass 103 in crucible 105 until the glass melts. A nozzle kiln 109 is partially housed in a bottom wall of the crucible kiln 107. Part of the nozzle kiln 109 protrudes below the bottom wall of the crucible kiln 107. The nozzle kiln 107 heats glass in nozzle 15.

In FIG. 1A, the crucible kiln 107 and nozzle kiln 109 are positioned above an annealing kiln 111. A build platform 108 is positioned inside the annealing kiln 111. A support rod 106 supports the build platform 108. The support rod 106 is operatively connected to a gear 104 that transmits mechanical force from an actuator. The force causes rod 106, and thus build platform 108, to move up and down vertically.

Figure 1B:
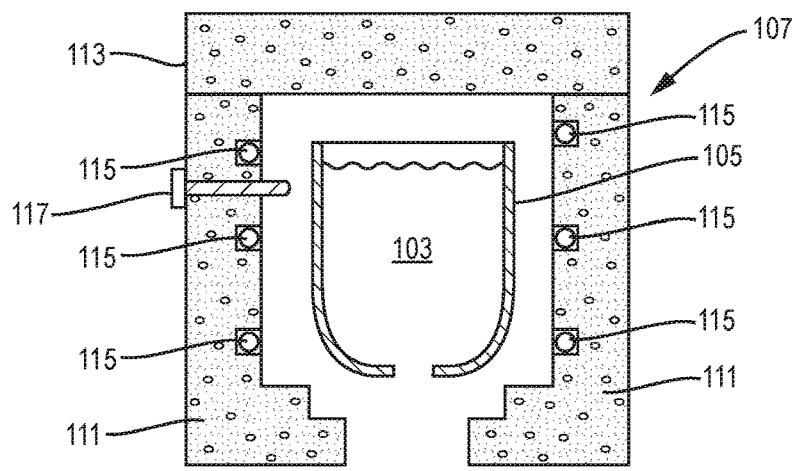
FIG. 1B is a cross-sectional view of a crucible kiln.

FIG. 1B is a cross-sectional view of a crucible kiln 107, in an illustrative implementation of this invention. In FIG. 1B, electrical heating elements 115 heat a crucible 105 containing glass 103. For example, in some cases, heating elements 115 in crucible kiln 107: (a) heat the glass 103 in crucible 105 to a temperature of 2000 degrees Fahrenheit for at least two hours, during a melting and fining step; and (b) heat the glass 103 in crucible 105 to a temperature of 1900 degrees Fahrenheit during deposition of the glass to form the 3D glass object being manufactured (i.e., during "printing"). During the fining step, bubbles are removed from the melted glass. In some cases, fining agents are placed in the crucible 105 prior to the fining step, and facilitate the fining (removal of bubbles). For example, in some cases, the fining agents comprise a sulfate (e.g., $2SO_3$), $4CeO_2$, arsenic oxide or an antinomy oxide.

In FIG. 1B, the side and bottom walls 111 of the crucible kiln 107 are insulated. Likewise, the lid 113 of the crucible kiln 107 is insulated. A temperature sensor 117 measures temperature in the crucible kiln 107. For example, in some cases: (a) the temperature sensor 117 comprises a Type K thermocouple; (b) wires that are rated for high temperatures connect the temperature sensor 117 and heating elements 115 to a PID (proportional-integral-derivative) controller; and (c) the PID controller controls heating elements 115.

Figure 1C:
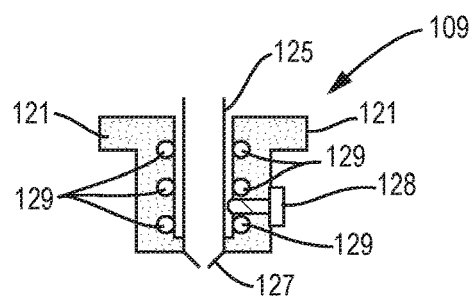
FIG. 1C is a cross-sectional view of a nozzle kiln.

FIG. 1C is a cross-sectional view of a nozzle kiln 109, in an illustrative implementation of this invention. In FIG. 1C, electrical heating elements 129 heat glass in a nozzle 125. For example, in some cases, the nozzle kiln heats glass in the nozzle to a temperature of 1850 degrees Fahrenheit. Glass enters the nozzle 125 from the crucible 105 and exits the nozzle at the nozzle tip 127. The walls 121 of the nozzle kiln 109 are insulated. A temperature sensor 128 measures temperature in the nozzle kiln 109. For example, in some cases: (a) the temperature sensor 128 comprises a Type S thermocouple; (b) wires that are rated for high temperatures connect the temperature sensor 128 and heating elements 129 to a PID controller; and (c) the PID controller controls heating elements 129.

Figure 1D:
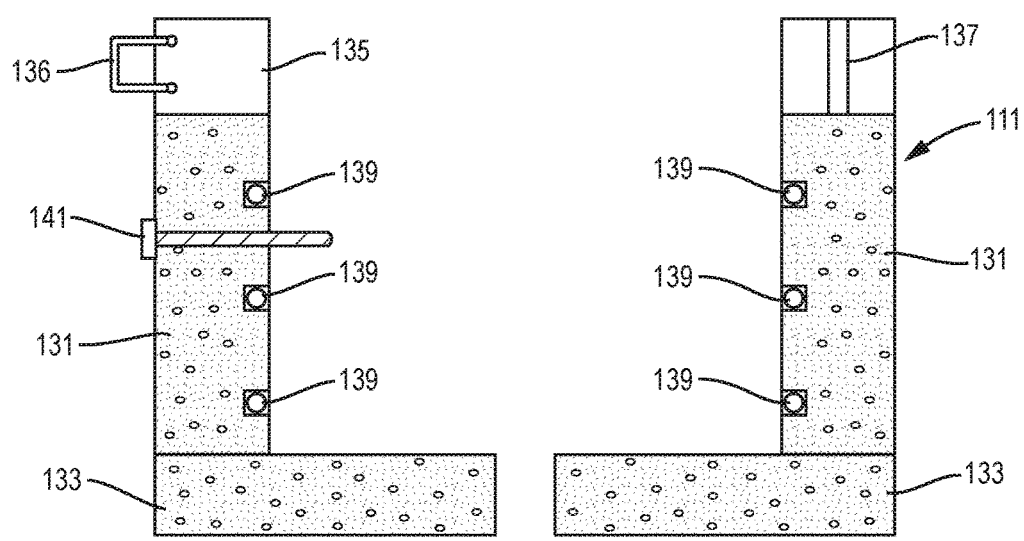
FIG. 1D is a cross-sectional view of an annealing kiln.

FIG. 1D is a cross-sectional view of an annealing kiln 111, in an illustrative implementation of this invention. The walls 131, 133 of annealing kiln 111 are insulated. In FIG. 1D, electrical heating elements 139 heat the interior cavity (annealing chamber) of the annealing kiln 111. For example, in some cases: (a) heating elements 139 maintain a temperature of at least 900 degrees Fahrenheit in the annealing chamber during deposition of the molten glass; and (b) after deposition of the molten glass is complete, heating elements 139 continue to heat the annealing chamber, but at slowly decreasing temperature setpoints. For example, in some cases, starting when deposition of the glass is complete, the temperature setpoint for the annealing chamber is set to 900° F. for one hour, then 750° F. for three hours, then 300° F. for five hours, then 175° F. for 1.5 hours, and then 70° F. for 0.5 hours. Slowly lowering the temperature of the glass (i.e., annealing the glass) releases thermal stresses in the glass and causes the glass to be crack free and much stronger than it would if it were allowed to quickly cool to room temperature.

In FIG. 1D, a temperature sensor 141 measures temperature in the annealing kiln 111. For example, in some cases: (a) the temperature sensor 141 comprises a Type K thermocouple; (b) wires that are rated for high temperatures connect the temperature sensor 141 and heating elements 139 to a PID controller; and (c) the PID controller controls heating elements 139.

In FIG. 1D, a window 137 allows a user outside the annealing chamber to look through the window 137 into the annealing chamber. For example, in some cases, window 13 comprises a Neoceram® window that is rated for high temperatures.

In FIG. 1D, a refractory door 135 provides access to the interior of the annealing chamber, allowing a user to access the nozzle tip in the annealing chamber. Door 135 has a handle 136. A second, wider refractory door (not shown in FIG. 1D) also provides access to the interior of the annealing chamber. This second door is sufficiently wide that a user may reach into the annealing chamber and remove the 3D glass object that has been created by the printer.

In FIGS. 1B, 1C, 1D, the heating elements 115, 129, 139 comprise resistive heating elements or inductive heating elements. For example, in some cases, each heating element 115, 129, 139 comprises a Kanthal® resistive coil. For example, in some other cases, each heating element 115, 129, 139 comprises an electromagnet that undergoes inductive heating when subjected to a high frequency alternating current. For example, in some cases, the high frequency AC current is generated by an electronic oscillator (not shown).

Figure 2:
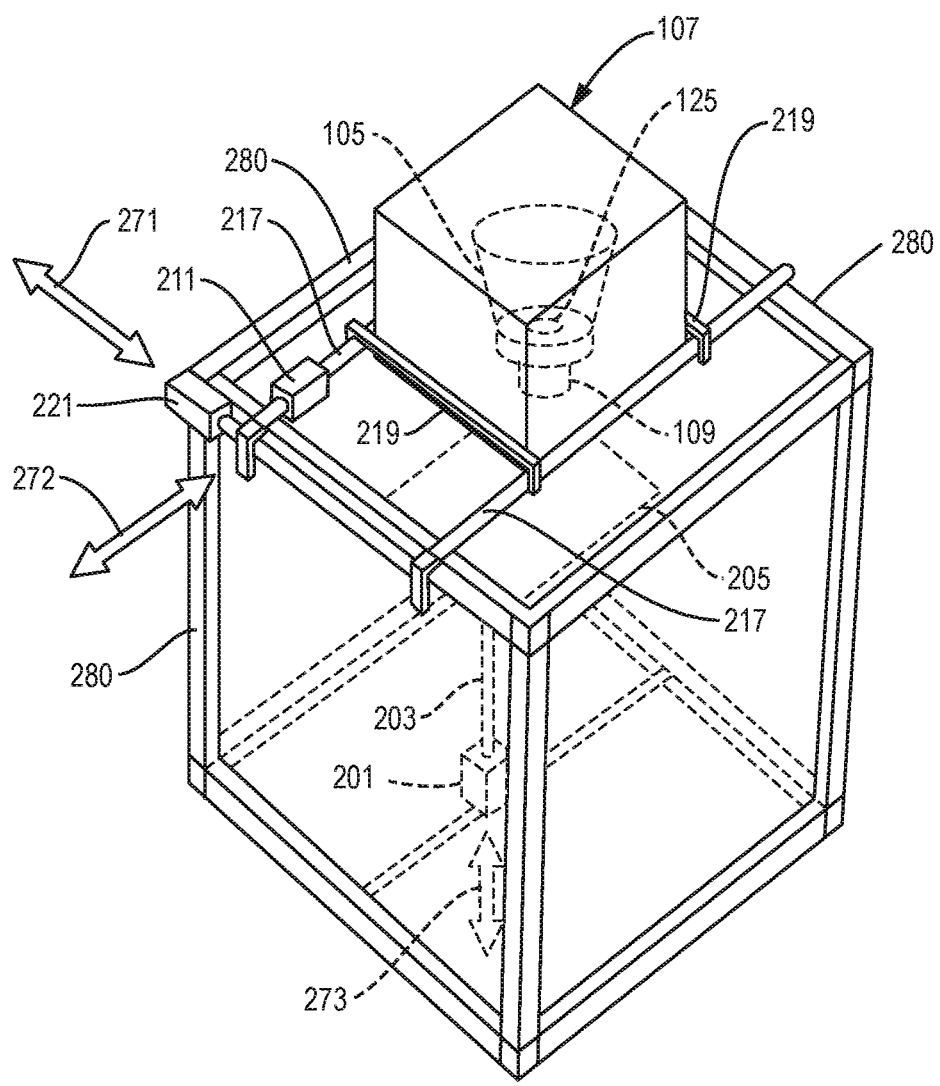
FIG. 2 is a perspective view of an apparatus for additive manufacture of glass.

FIG. 2 is a perspective view of an apparatus for additive manufacture of glass, in an illustrative implementation of this invention. In FIG. 2, actuators cause x, y motion of the print head (including the crucible kiln) and z-motion of the build platform.

As used herein, "x, y motion" means motion in two horizontal axes that are perpendicular to each other. As used herein, "z motion" means vertical motion. Likewise, as used herein, "x" and "y" directions means two directions that are horizontal and are perpendicular to each other, and "z" direction means a vertical direction. Likewise, as used herein, "x" and "y" axes mean two axes that are horizontal and are perpendicular to each other, and a "z" axis means a vertical axis.

In FIG. 2, motor 211 actuates x movement of the print head (including nozzle 125, crucible kiln 107, crucible 105, and nozzle kiln 109) in a direction parallel to a horizontal x axis 272. Motor 221 actuates y movement of the print head (including nozzle 125, crucible kiln 107, crucible 105, and nozzle kiln 109) in a direction parallel to horizontal y axis 271. X-axis 272 and y-axis 271 are horizontal and perpendicular to each other. Motor 201 actuates movement of the build platform 205 and support rod 203 in a direction parallel to vertical z axis 273.

In FIG. 2, motor 221 is attached to frame 280 and is stationary with respect to frame 280. Motor 221 causes moveable component 217 (and the print head, which is supported by moveable component 217) to move in a y direction. Moveable component 217 includes roller bearings that travel in a direction parallel to horizontal y axis 271 along structural tracks that are part of frame 280.

In FIG. 2, motor 211 is attached to moveable component 217 and is stationary with respect to moveable component 217. Motor 211 causes a carriage 219 to move in an x direction parallel to horizontal x-axis 272, along support rails that are part of moveable component 217. Carriage 219 rests on roller bearings that travel along these support rails. In some cases, carriage 219 comprises steel.

In FIG. 2, the print head (including nozzle 125, crucible kiln 107, crucible 105, and nozzle kiln 109) is attached to, and supported by, carriage 219. The print head moves with carriage 219.

In FIG. 2, motor 201 actuates z movement and is positioned beneath the annealing kiln (not shown in FIG. 2). Support rod 203 passes through the bottom wall of the annealing kiln and supports the build platform 205.

In some cases, x, y and z motions are actuated by three lead screw gantry systems that include motors 211, 221 and 201, respectively. In some cases, motors 201, 211, and 221 comprise stepper motors or servo motors. In some cases, the motors are controlled by driver circuits that are controlled by one or more microcontrollers (e.g., an Arduino® board and shield). The microcontrollers are in turn controlled by another computer.

Figure 3:
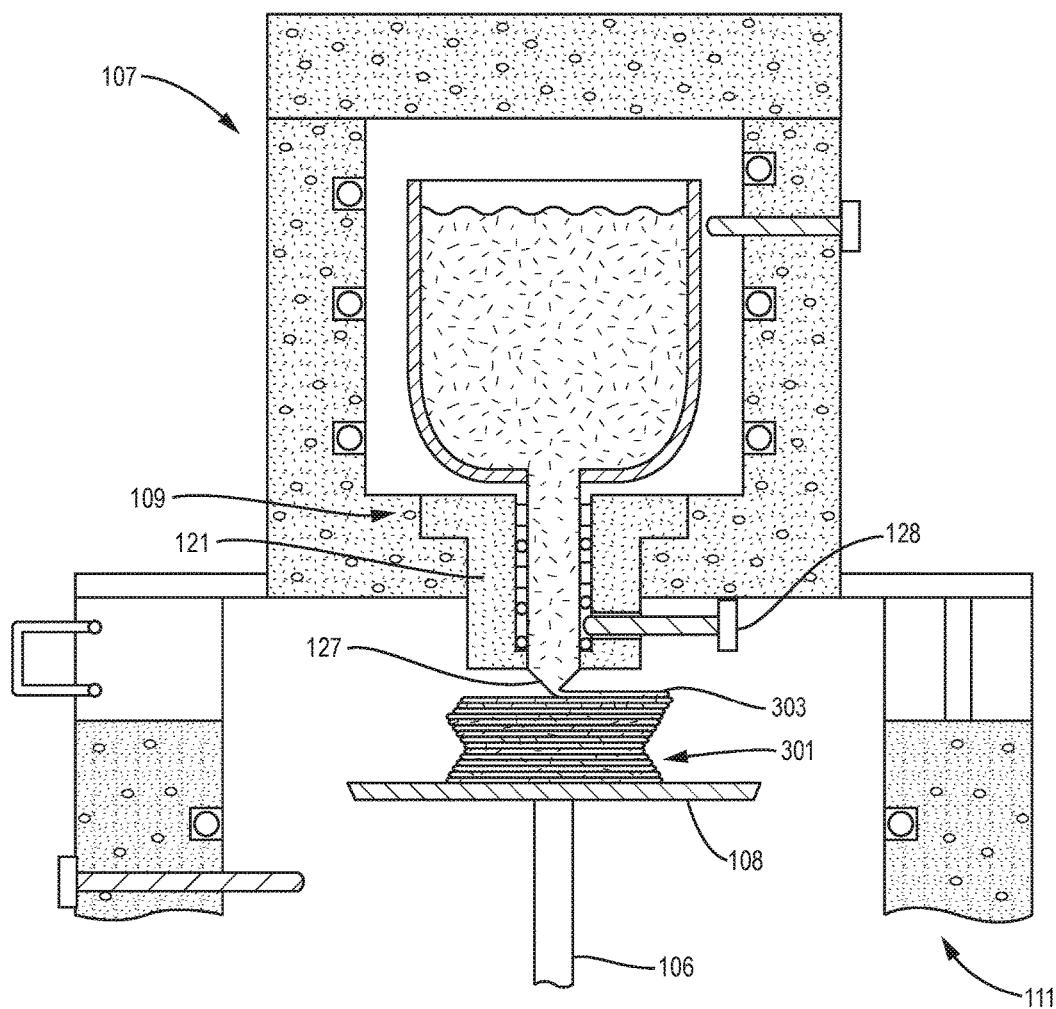
FIG. 3 shows deposition of molten glass.

FIG. 3 shows deposition of molten glass, in an illustrative implementation of this invention. In FIG. 3, a nozzle tip 127 is positioned at a height equal to the top of the layer 303 of molten glass being deposited, while molten glass flows through the nozzle tip 127. Positioning the nozzle tip at this height (equal to the top of the layer then being deposited) tends to create stronger bonds between layers and print objects with consistent layer height, as compared to positioning the nozzle tip at a greater height. The better adhesion and the bigger contact surface between layers lead to higher transparency in the vertical direction.

In some cases, the molten glass comprises a soft, flexible filament of molten glass as it exits the nozzle.

In the example shown in FIG. 3, the molten glass is selectively deposited layer-by-layer. For each layer, actuators (e.g., motors 211, 221) move the print head (including the nozzle 125, crucible kiln 107, crucible 105, and nozzle kiln 109) in x, y movements to control the x, y coordinates of where the glass is deposited in the layer. The region(s) in which glass is deposited may vary from layer to layer. Printing instructions (e.g., g-codes) generated by a computer from a CAD file control the movement of the print head and thus the region(s) in which glass is deposited in each layer. While each layer is being deposited, an actuator (e.g. motor 201) gradually lowers the build platform by a vertical distance equal to the vertical thickness of the layer. Printing instructions control the actuator (e.g., motor 201) that causes the z movement of the build platform.

Alternatively or in addition, in some cases, at least a portion of the deposition of glass is not layer-by-layer. For example, in some cases, molten glass is deposited at a position such that the glass dribbles down the edge of one or more previously deposited layers and stops at a level lower than the layer most recently deposited.

In the example shown in FIG. 3, only part of the layers of the glass object 301 have been deposited, the remaining layers of glass object 301 have not yet been deposited.

In some implementations of this inventions, cool fluid flows through tubes or cavities near the tip of the nozzle and cools the nozzle tip, in order to reduce the amount of glass that sticks to the nozzle tip, and thus to reduce fouling of the nozzle. As used herein, to "foul" means to build up glass on a surface of the nozzle tip. For example, in some cases, glass is heated to approximately 1850° Fahrenheit in the nozzle, and it is desirable that the nozzle tip be at a lower temperature than the glass. This is because lowering the temperature of the nozzle tip tends to reduce the amount of glass that sticks to the nozzle tip—that is, the lower the temperature of the nozzle tip, the less amount of molten glass that sticks to the nozzle tip.

Figure 4C:
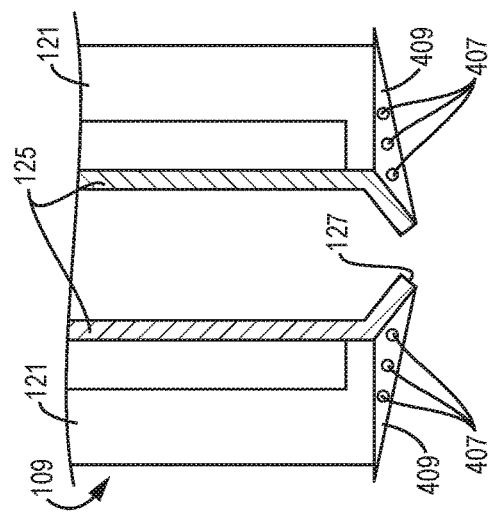
FIGS. 4A, 4B and 4C are cross-sectional views of tubes or cavities for cooling a nozzle tip.
Figure 4B:
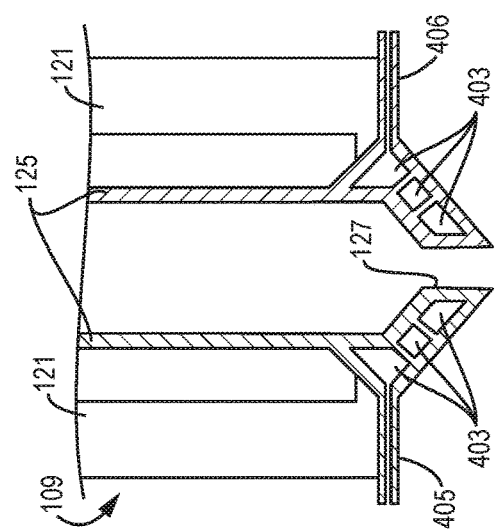
Figure 4A:
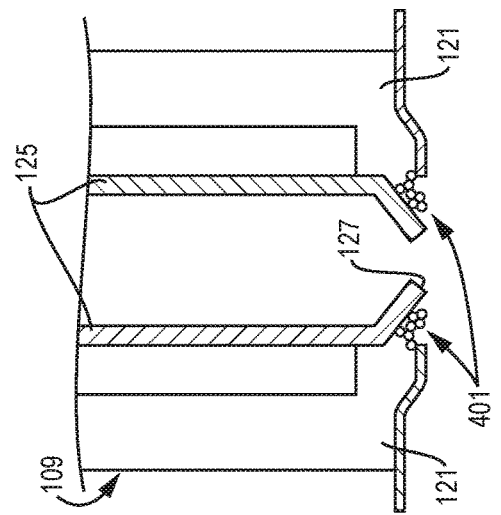

FIGS. 4A, 4B and 4C are cross-sectional views of tubes or cavities for cooling a nozzle tip, in an illustrative implementation of this invention. In FIG. 4A, a cool fluid flows through tubes 401, and thereby cools nozzle tip 127. In FIG. 4B, a cool fluid flows through cavity 403, and thereby cools nozzle tip 127. Fluid enters and exits cavity 403 through tubes 405 and 406, respectively. In FIG. 4C, a cool fluid flows through tubes 407, and thereby cools a fluid in a cavity 409, which in turn cools nozzle tip 127.

In the examples shown in FIGS. 4A, 4B and 4C: (a) the fluid may comprise any liquid or gas, including water or air; (b) the fluid may be at a higher pressure than ambient air; (c) one or more pumps may pump the fluid through, into or out of the tubes or cavity; and (d) the fluid may recirculate, and in each circulation cycle, one or more heat exchangers may remove heat from the fluid before the fluid is sent near the nozzle tip again.

Figure 5A:
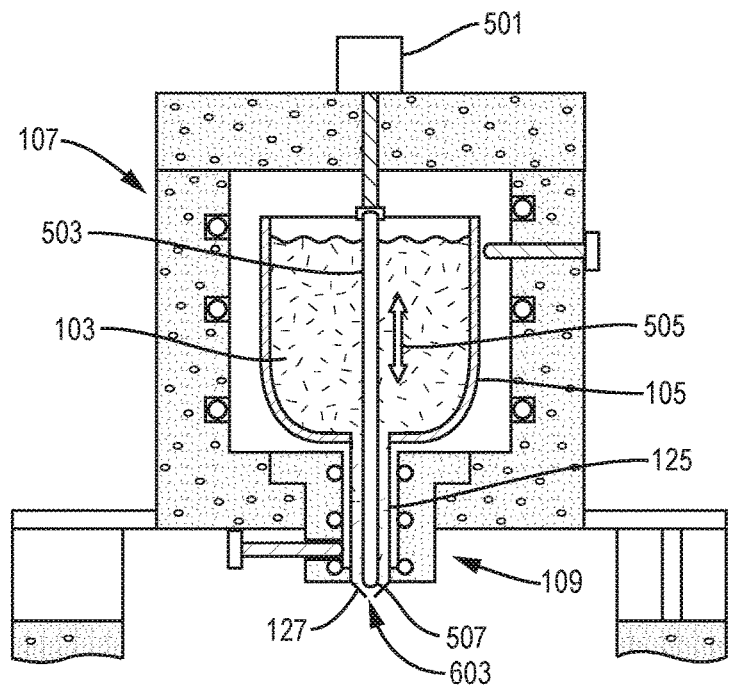
FIGS. 5A and 5B are cross-sectional views of valves for controlling flow of molten glass from the crucible.
Figure 5B:
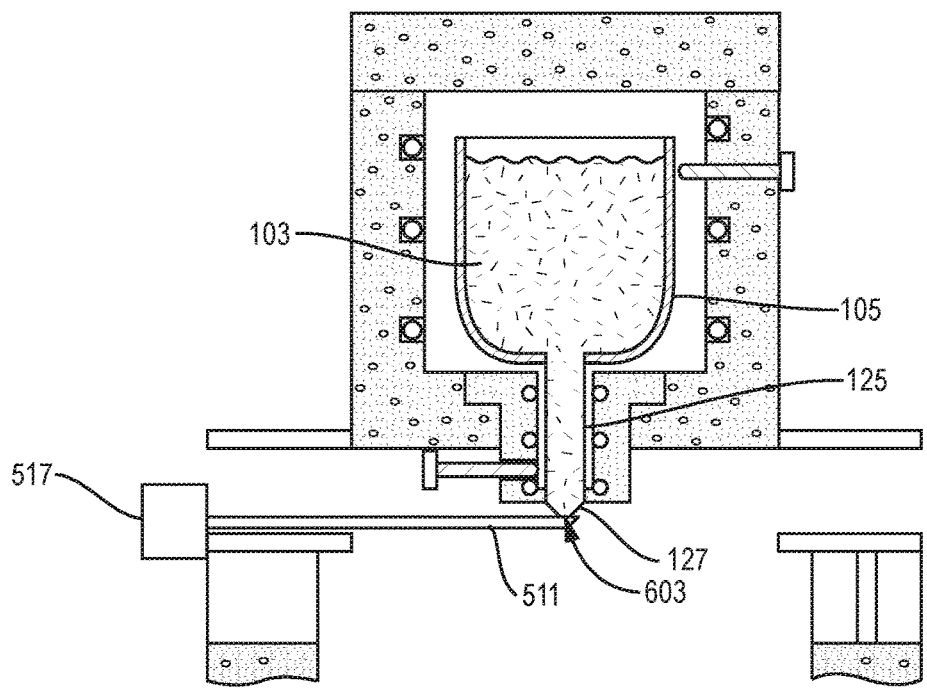

FIGS. 5A and 5B are cross-sectional views of valves, in an illustrative implementation of this invention. The valves control flow of molten glass 103 through the nozzle 125.

In FIG. 5A, the valve comprises a refractory rod 503 actuated by a motor 501 mounted on the crucible kiln lid. The rod 503 moves up and down in a direction parallel to vertical axis 505, allowing or blocking flow of molten glass through the exit orifice 603 of nozzle 125. When the bottom tip 507 of rod 503 touches the inside wall of the nozzle tip 127, exit orifice 603 of nozzle 125 is blocked, and no glass flows through exit orifice 603 of nozzle 125. When the tip 507 of the rod is raised, such that tip 507 does not touch the inside wall of the nozzle tip 127, exit orifice 603 is not blocked, and molten glass flows through the exit orifice 603 of nozzle 125.

In FIG. 5B, the valve comprises refractory shears 511. When open, the shears 511 surround, but do not intrude into, a region immediately below the nozzle tip 127, thereby allowing molten glass to flow through the exit orifice 603 of nozzle 125. As the shears 511 are closed, the shears 511 cut the molten glass filament exiting the nozzle 125. When the shears 511 are closed, they block the exit orifice 603 of nozzle 125 and prevent molten glass from flowing through exit orifice 603. In some cases, the shears 511 comprise stainless steel or an Inconel® austenite nickel-chromium-based superalloy, or comprise (or are coated with) tungsten carbide. The shears are actuated by motor 517.

In each of FIGS. 5A and 5B: (a) the actuator (motor 501 or motor 517) is controlled by a driver circuit, which is in turn controlled by an Arduino® board and shield, which are controlled by another computer; and (b) the g-code instructions include instructions for controlling valve movements.

In some implementations of this inventions, one or more disposable sheets of refractory material cover the nozzle tip, except the nozzle orifice, in order to reduce fouling of the nozzle. After solidified glass builds up on a disposable sheet, the sheet is removed and replaced with a new disposable sheet. In some cases, the refractory sheets comprise metal, such as stainless steel, or an Inconel® austenite nickel-chromium-based superalloy, or tungsten carbide.

Figure 6A:
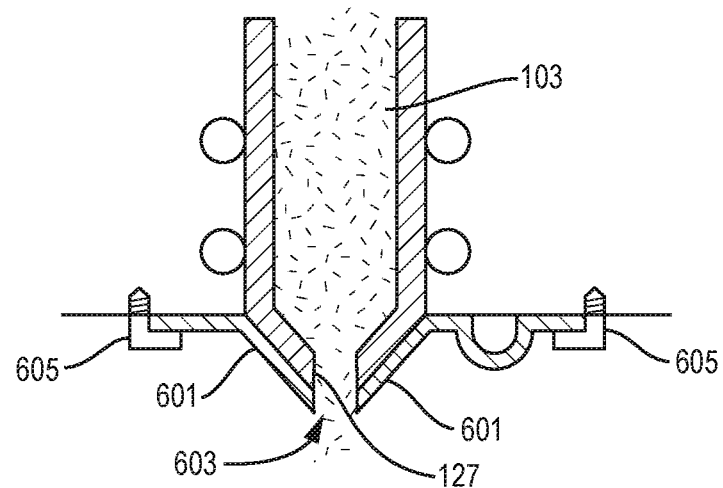
FIG. 6A is a cross-sectional view of a disposable metal sheet that is positioned adjacent to a nozzle tip.
Figure 6B:
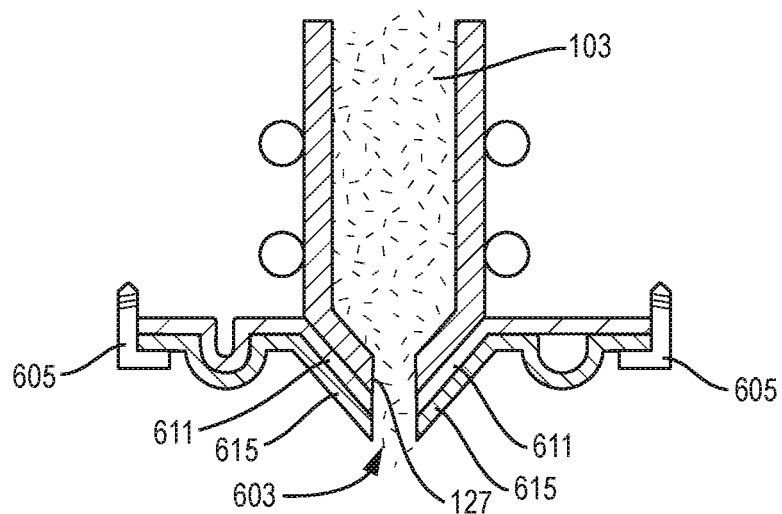
FIG. 6B is a cross-sectional view of two disposable metal sheets that are positioned adjacent to a nozzle tip.

FIG. 6A is a cross-sectional view of a disposable metal sheet 601 that is positioned adjacent to nozzle tip 127, in an illustrative implementation of this invention. FIG. 6B is a cross-sectional view of two disposable metal sheets 611, 615 that are positioned adjacent to nozzle tip 127, in an illustrative implementation of this invention. In both FIGS. 6A and 6B, fasteners (e.g., 605) hold the disposable sheet(s) stationary relative to the nozzle tip 127. In some cases, the fasteners (e.g., 605) comprise refractory clips or refractory magnets.

In the example shown in FIG. 6A, a single disposable sheet (e.g., stainless steel, Inconel®, or tungsten carbide) 601 is press-formed to follow the shape of nozzle tip 127. A hole is cut in sheet 601 that corresponds to the nozzle orifice 603 to allow glass flow. A tab is introduced during press-forming to allow easy sheet removal through the use of pliers.

In the example shown in FIG. 6B, two or more disposable sheets are attached to the nozzle tip 127. After glass gets stuck to the lowest sheet, the lowest sheet is removed by pliers, thus uncovering the upper clean one. Tabs positioned in different areas allow removal of one sheet at a time.

Figure 7:
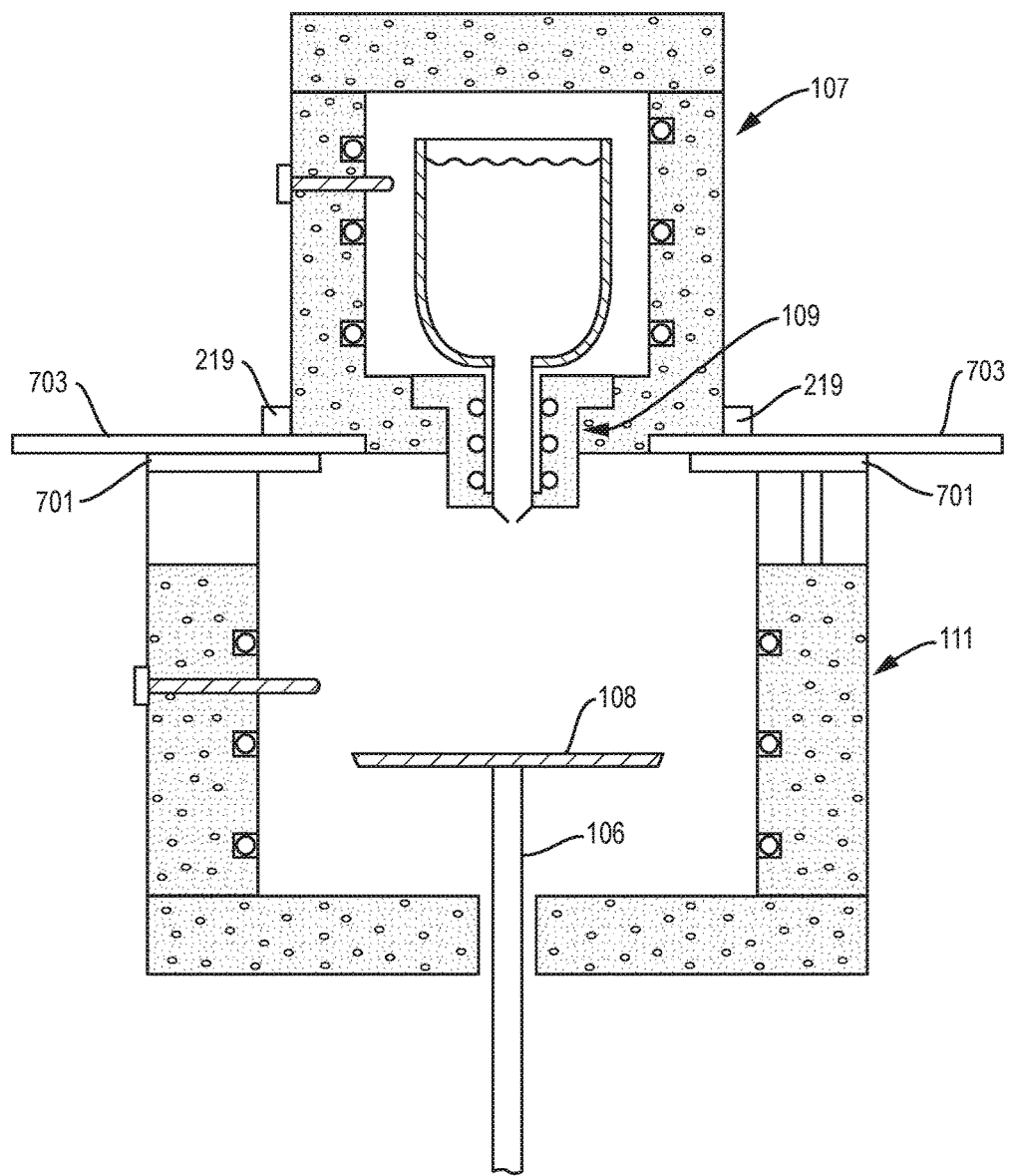
FIG. 7 is a cross-sectional view of insulation skirts.

FIG. 7 is a cross-sectional view of two insulation skirts 701 703, in an illustrative implementation of this invention. In FIG. 7, the insulation skirts 701, 703 assure that the annealing chamber is always kept closed on the top. A lower, static insulation skirt 701 is mounted on top of the annealing chamber. The upper insulation skirt 703 is attached to moveable carriage 219. The moveable carriage 219 is attached to and moves with the crucible kiln 107. The upper insulation skirt 219 is dimensioned to completely cover the top of the annealing chamber throughout the entire travel range of carriage 219 (and the printer head attached to carriage 219). In some cases, the insulation skirts 701, 703 comprise two ceramic fiber boards (e.g., Duraboard®).

In some implementations, it is advantageous to immobilize the print head (including nozzle 125, crucible 105, crucible kiln 107, and nozzle kiln 109). For example, immobilizing the print head allows the crucible to be larger and heavier and to contain more glass.

Figure 8A:
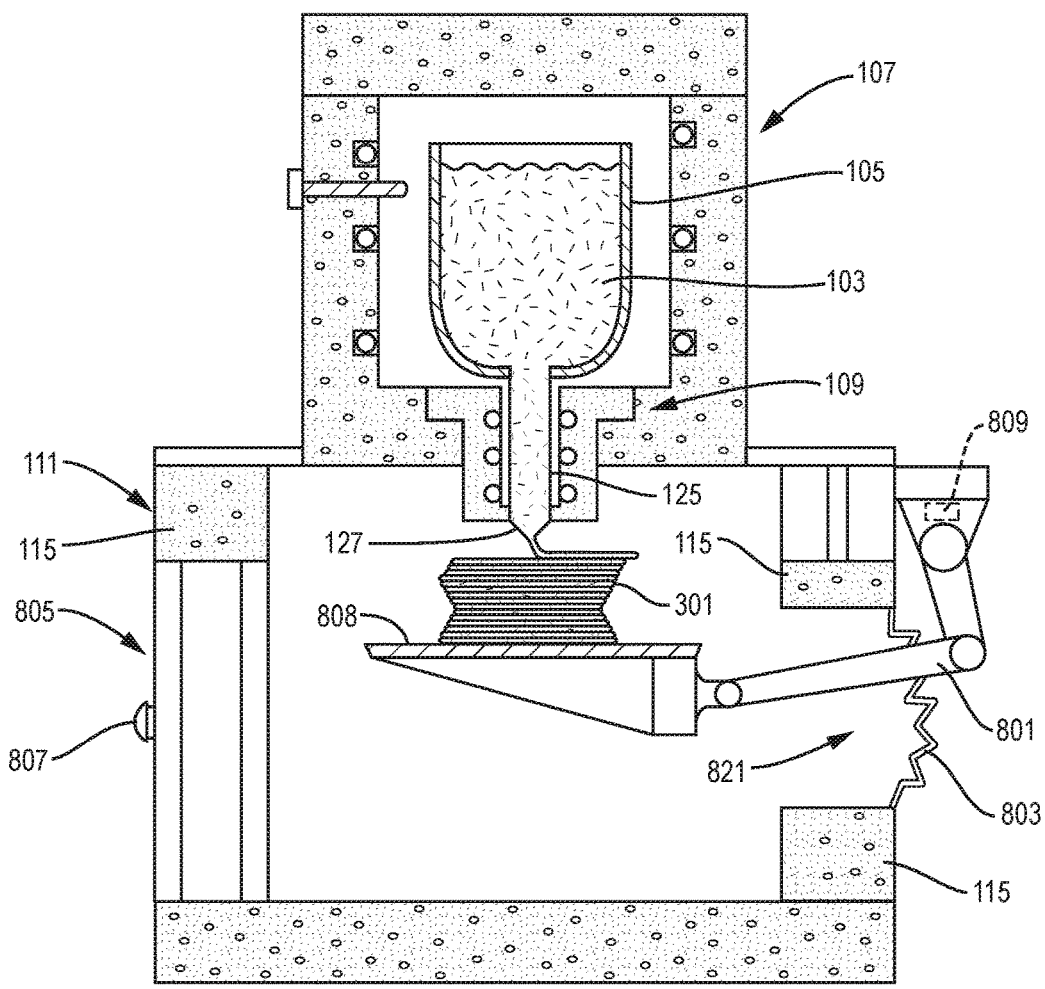
FIG. 8A is a cross-sectional view of an apparatus in which the print head is stationary.

FIG. 8A is a cross-sectional view of an alternative implementation of this invention, in which the print head is stationary. In the example shown in FIG. 8A, the print head (including nozzle 125, crucible 105, crucible kiln 107, and nozzle kiln 109) is stationary relative to the walls of the annealing kiln 111. A build platform 808 is attached to robotic arm 801. The robotic arm 801 moves with multiple degrees of freedom. For example, in some cases, the robotic arm 801 moves with three, four, five, six or more degrees of freedom. In FIG. 8A, one or more motors 809 actuate, via robotic arm 801, motion of build platform 808 relative to nozzle 127; and (b) this motion controls the vertical z position and horizontal x, y position of build platform 808 and thus controls where glass exiting the nozzle 127 is deposited. The one or more motors 809 are each controlled by a driver circuit, which is in turn controlled by one or more computers.

In FIG. 8A, the robotic arm 801 enters annealing kiln 111 through an opening 821 in the walls 115 of annealing kiln 111. Insulation 803 reduces the amount of heat that exits through this opening 821. In some cases, insulation 803 comprises an insulation skirt or an insulated bellows. Also, a refractory door 805 with door handle 807 provides access to the interior of annealing chamber 111. The door 805 is sufficiently wide that a user may open the door and remove the fabricated glass object after it cools.

Figure 8B:
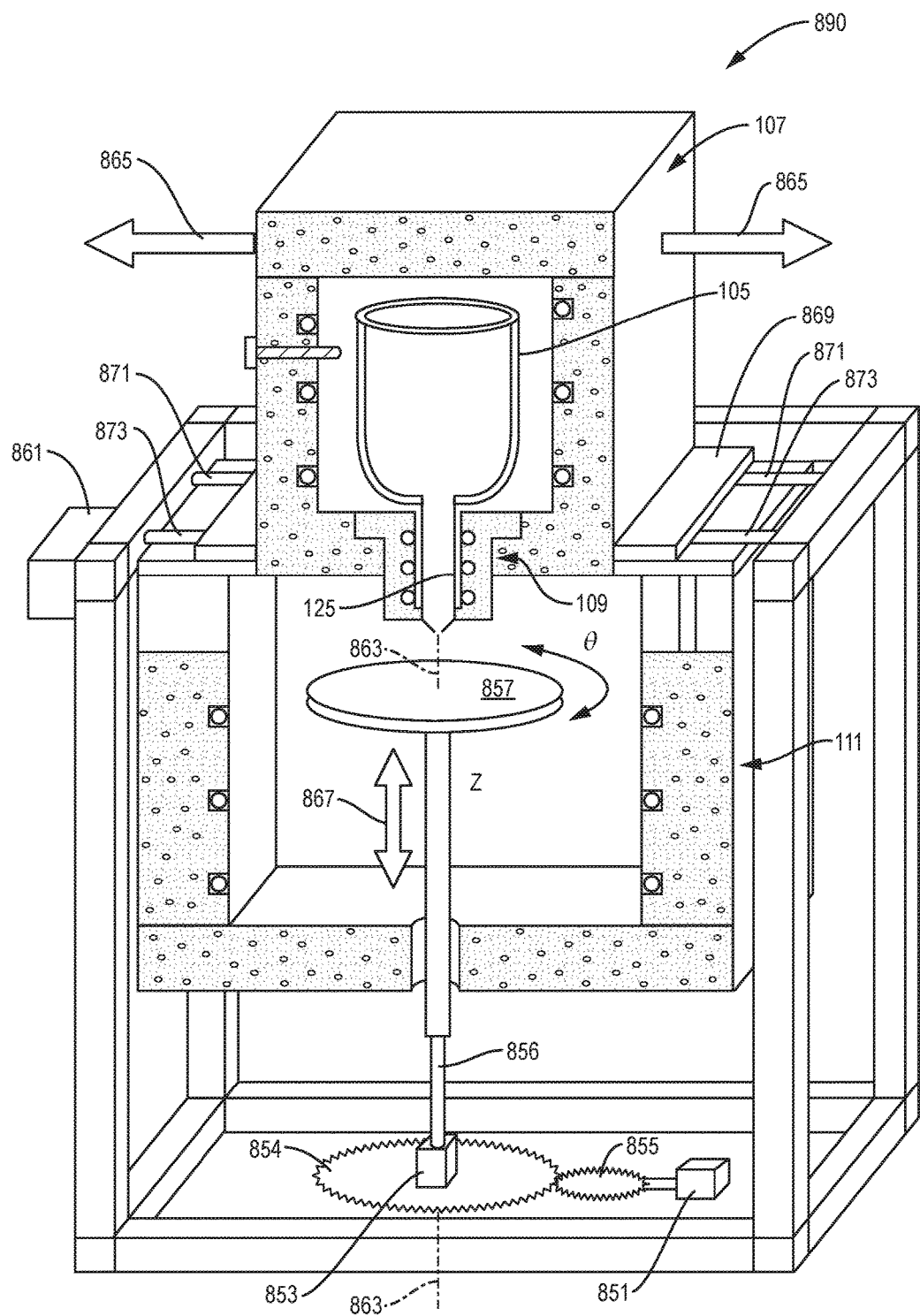
FIG. 8B is a cross-sectional view of an apparatus, in which a first actuator causes the build platform to rotate, and a second actuator causes the crucible kiln to move along a linear axis.

FIG. 8B is a cross-sectional view of an apparatus 890 in which an actuator causes build platform 858 to rotate, in an illustrative implementation of this invention. This apparatus 890 is sometimes referred to herein as a "polar printer". In the polar printer 890 shown in FIG. 8B: (a) motor 851 actuates build platform 857 to rotate about the build platform's center line 863; (b) motor 861, via a lead screw, actuates carriage 869 to move parallel to linear axis "r" 865;

and (c) motor 853, via a lead screw, actuates build platform 857 to move vertically (up or down).

Thus, in FIG. 8B, polar printer 890 causes motion in 3 coordinates: r (radial distance), θ (angle) and z (height). The print head (including nozzle 125, crucible 105, crucible kiln 107, and nozzle kiln 109) moves in the r dimension. The build platform 857 moves up and down (z) in a direction parallel to vertical axis 867. The build platform 857 also rotates (θ) around its center line 863. The center line 863 of build platform 857 is perpendicular to the top surface of build platform 857 and intersects the center of build platform 857. The center line 863 of build platform 857 is co-located with the longitudinal axis of rod 856.

In FIG. 8B, polar printer 890 limits the movement of the print head to only one dimension, the so-called "r" dimension. This, in turn, allows bigger crucible kilns.

In FIG. 8B, motors 853, 861 are part of stepper motor-lead screw systems that actuate r and z movements. Motor 851 actuates θ movement (i.e., rotation) of build platform 857 via a series of gears and components, as follows: motor 851 causes gear 855 to rotate, which in turn causes gear 854 to rotate. This in turn causes z motor 853 (which is mounted on gear 854) to rotate. This in turn causes rod 856 and build platform 857 to rotate about center line 863.

In FIG. 8B, motor 861 actuates the print head (including nozzle 125, crucible 105, crucible kiln 107, and nozzle kiln 109) to move along the r-axis. The print head rests on bearings that travel along rails 871, 873.

In FIG. 8B, motors 851, 853, 861 are each controlled by a driver circuit, which is in turn controlled by one or more computers.

Figure 9:
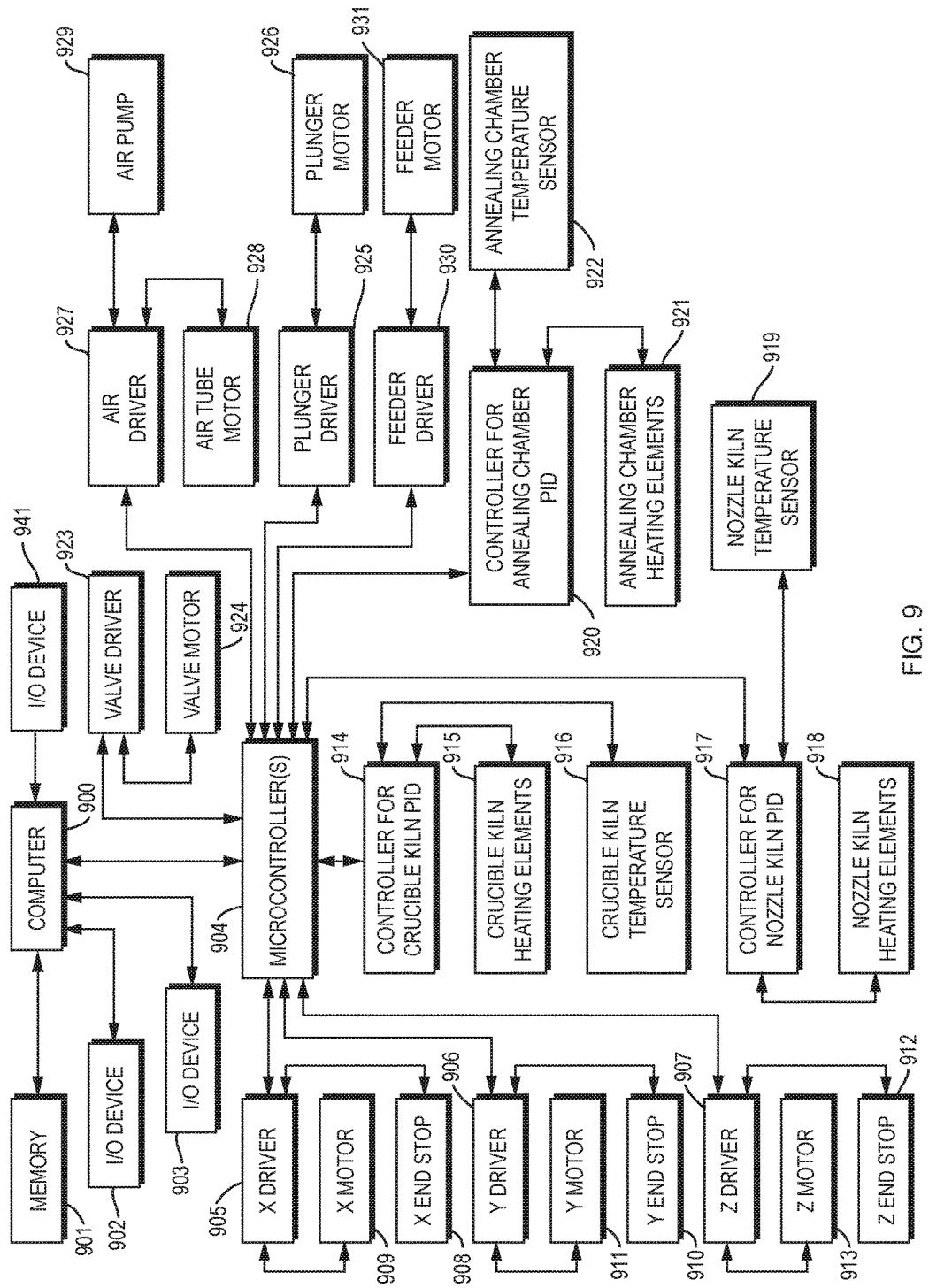
FIG. 9 is a block diagram showing hardware components that interface with, or are controlled by, one or more computers.

FIG. 9 is a block diagram showing hardware components that interface with, or are controlled by, one or more computers, in an illustrative implementation of this invention.

In the example shown in FIG. 9, a computer 900 receives input from a human user, and provides output (in human-perceptible form) to a human user, via one or more I/O devices (e.g., 902, 903, 941). For example, in some cases, I/O devices 902, 903, 941 comprise a computer monitor, keyboard and mouse, respectively. The computer 900 stores data in an electronic memory device 901, and accesses/reads data that is stored in memory device 901.

In the example shown in FIG. 9, the computer controls one or more microcontrollers 904. For example, in some cases, the microcontrollers 904 comprise an Arduino® PCB (printed circuit board) and one or more Arduino® shield PCBs, including a shield for controlling motors. In some cases: (a) the computer 900 takes as input, a CAD (computer-aided-design) file; (b) the CAD file includes a digital 3D model of a target object (i.e., the 3D glass object to be fabricated); (c); the computer "slices", layer by layer, the digital model; (d) the computer 900 outputs g-code instructions for each layer, and (e) the g-code instructions are transmitted to the microcontrollers 904 and control the selective deposition of glass in layers, in order to manufacture the target object.

In FIG. 9, the microcontrollers 904 control actuation in x, y and z directions, as follows: Microcontrollers 904 control an x-driver circuit 905, y-driver circuit 906 and z-driver circuit 907. The x-driver circuit 905 receives sensor data from x end stop sensor 908 and controls x-motor 909, thereby controlling actuation along an x-axis. The y-driver circuit 906 receives sensor data from y end stop sensor 910 and controls y motor 911, thereby controlling actuation along a y-axis. The z-driver circuit 907 receives sensor data from z end stop sensor 912 and controls z-motor 913, thereby controlling actuation along a z-axis.

In FIG. 9, controllers 914, 917, 920 perform PID control of heating elements of the crucible kiln, nozzle kiln and annealing kiln, respectively. For example, in some cases, controllers 914, 917, 920 each comprise a PLC (programmable logic controller) or other digital controller. Controller 914 receives sensor data from crucible kiln temperature sensor 916 and controls crucible kiln heating elements 915. Controller 917 receives sensor data from nozzle kiln temperature sensor 919 and controls nozzle kiln heating elements 918. Controller 920 receives sensor data from annealing kiln temperature sensor 922 and controls annealing kiln heating elements 921. In some cases, the temperature sensors 916, 919, 922 comprise thermocouples.

In some cases, valve driver circuit 923 controls a valve motor 924. The valve motor 924 actuates a valve. For example, in some cases, valve motor 924 opens and shuts a pair of shears 511, as shown in FIG. 5B. In some cases, valve motor 924 raises or lowers rod 503, as shown in FIG. 5A.

Figure 11A:
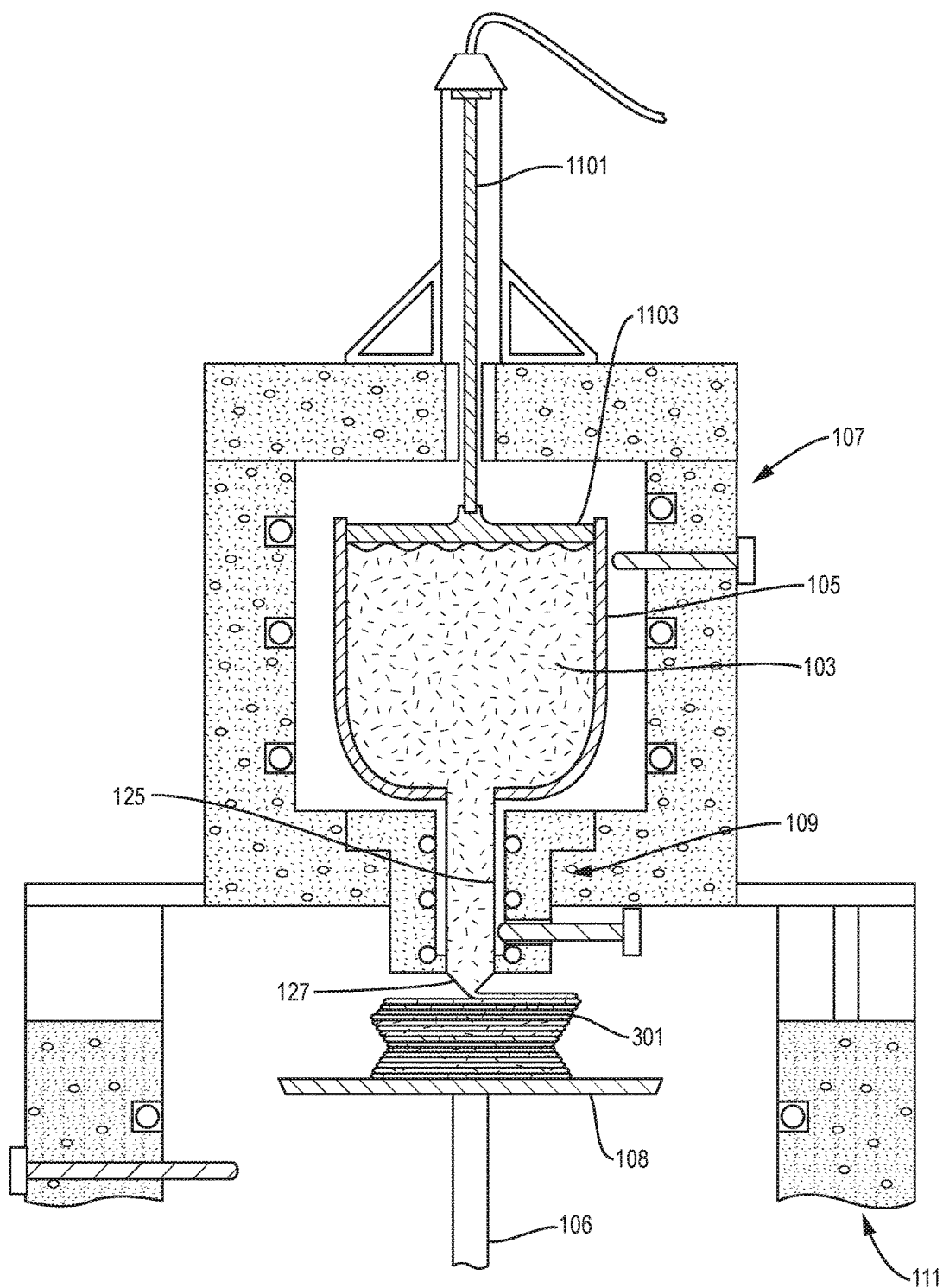
FIG. 11A is a cross-sectional view of an apparatus, in which a plunger exerts pressure that actively extrudes molten glass through a nozzle.

In some cases, a plunger driver circuit 925 controls a plunger motor 926. The plunger motor 926 actuates a plunger (e.g., 1103) that creates pressure to actively extrude molten glass, as shown in FIG. 11A.

Figure 11B:
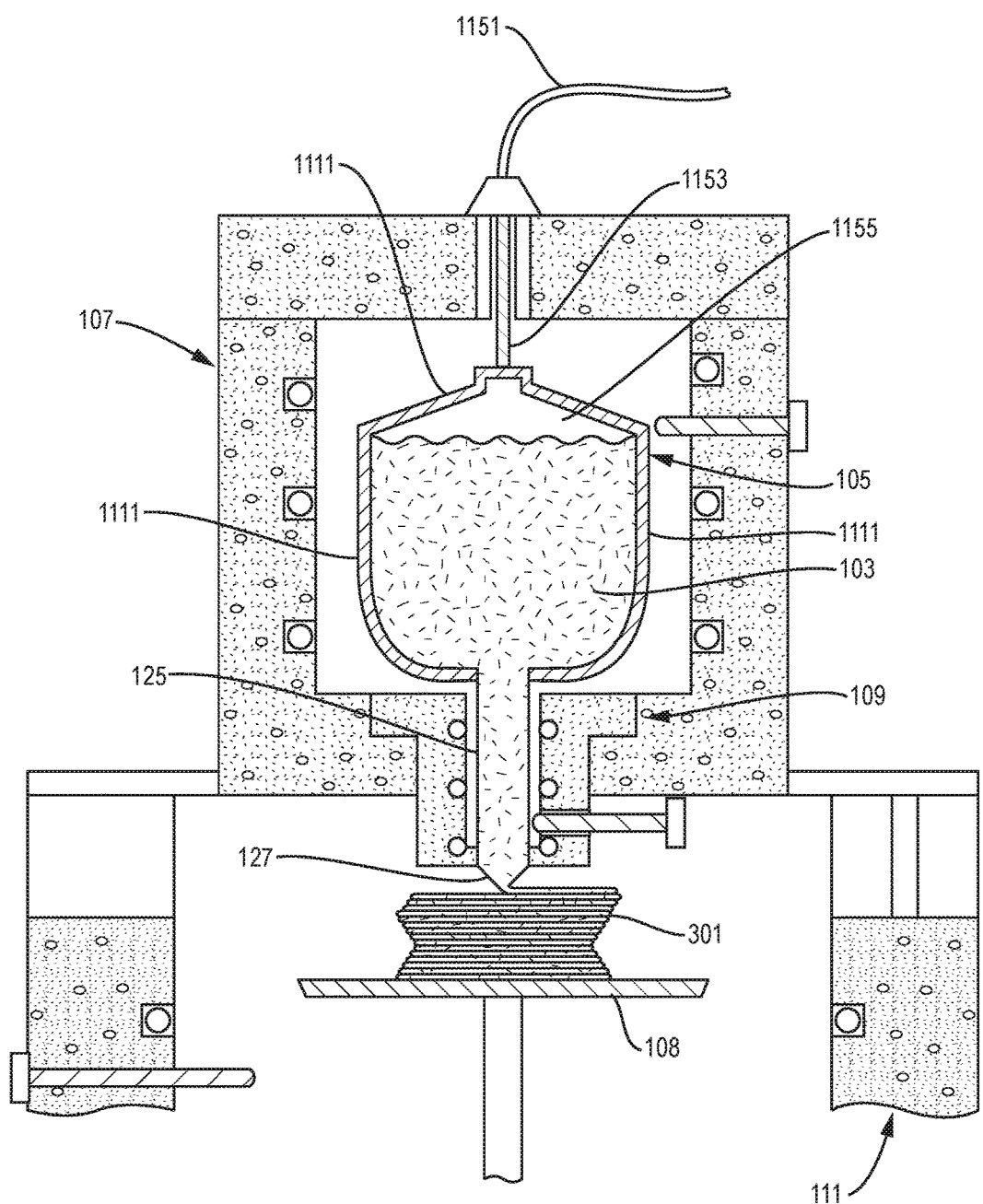
FIG. 11B is a cross-sectional view of an apparatus, in which air exerts pressure that actively extrudes molten glass through a nozzle.

In some cases, an air driver circuit 927 controls an air pump 929. The air pump 929 pumps compressed air that is used to created pressure to actively extrude molten glass, as shown in FIG. 11B. Alternatively, air pump 929 pumps compressed air that is pumped through an air blowing tube, such as air blowing tube 1303 shown in FIG. 13. In this alternative case (with an air blowing tube), air driver circuit 927 also controls air tube motor 928. This motor 928 actuates an air blowing tube (e.g., 1303), moving the tube up and down and thus closer to or further away from the nozzle tip.

In some cases, a feeder driver circuit 930 controls a feeder motor 931. The feeder motor 931 actuates a feeder mechanism for feeding materials into crucible 105. For example, in some cases, the feeder mechanism loads one or more of the following materials into the crucible 105: glass nuggets, glass ingots, glass powder, a glass rod or filament, or raw materials for manufacturing glass.

In some cases, instructions for one or more movements of a plunger, valve or tube are embedded in g-codes that are generated by computer 900.

In the example shown in FIG. 9, controllers 914, 917, 920 and drivers 923, 925, 927, 930 are connected by communication links to microcontrollers 904, and interface with, or are controlled by, microcontrollers 904. Alternatively, in some cases, one or more of controllers 914, 917, 920 and drivers 925, 927, 930 are connected by communication links to computer 900, and interface with, or are controlled by, computer 900. Alternatively, in some cases, one or more of controllers 914, 917, 920 and drivers 925, 927, 930 are connected by communication links to neither the computer 900 nor the microcontrollers 904.

In FIG. 9, the lines between electronic devices symbolize wired or wireless communication links.

Figure 10A:
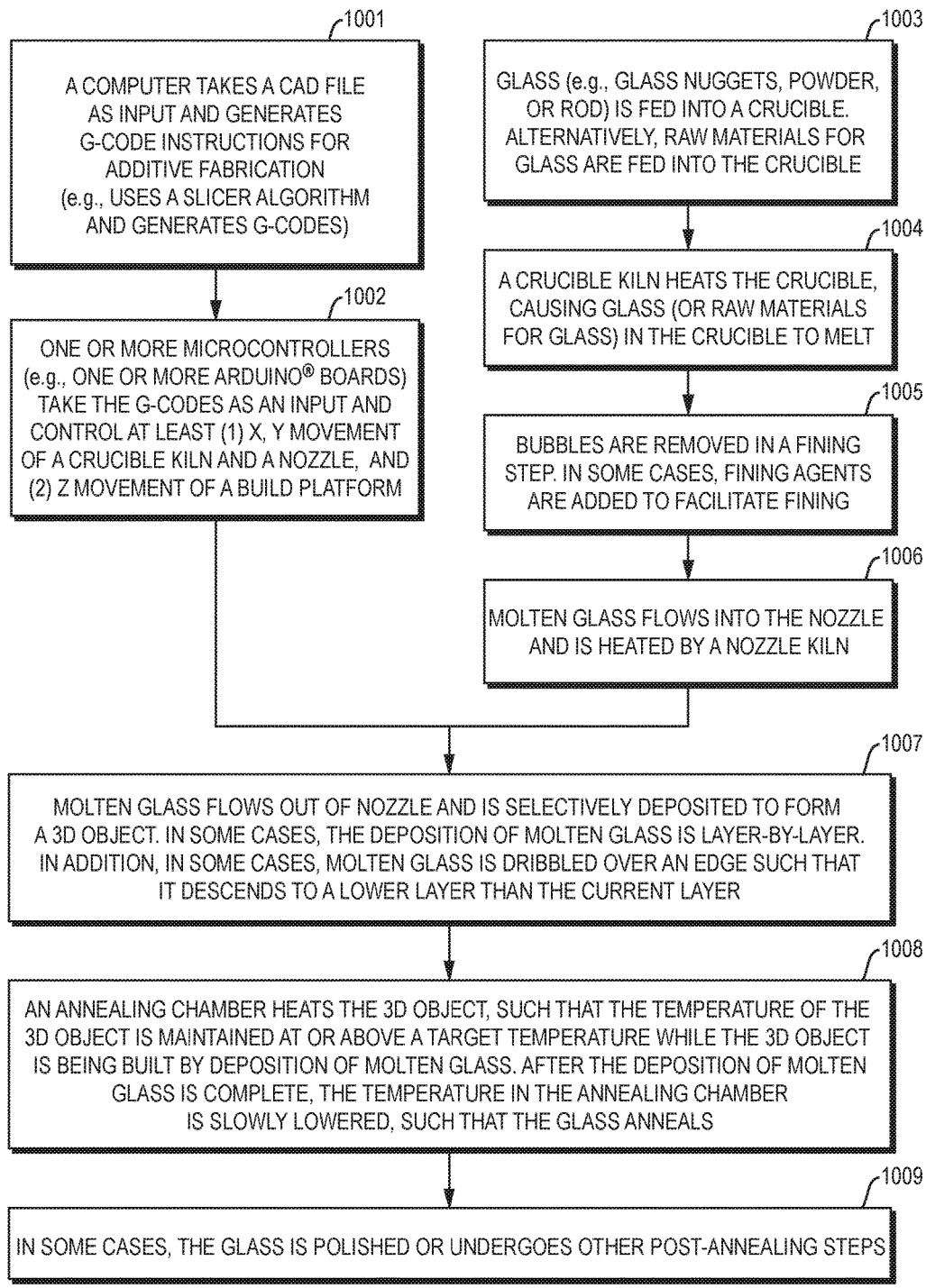
FIG. 10A is a flowchart that describes steps in a method for additive manufacture of glass.

FIG. 10A is a flowchart that shows steps in a method for additive manufacture of glass, in an illustrative implementation of this invention. The method shown in FIG. 10A includes the following steps: A computer takes a CAD file as input and generates g-code instructions for additive fabrication (e.g., uses a slicer algorithm to generate g-codes) (Step 1001). One or more microcontrollers (e.g. one or more Arduino® boards) take the g-codes as an input and control at least (1) x, y movement of a crucible kiln and a nozzle, and (2) z movement of a build platform (Step 1002). Glass (e.g., glass nuggets, powder, or rod) is fed into a crucible. Alternatively, raw materials for glass are fed into the crucible (Step 1003). A crucible kiln heats the crucible, causing glass (or raw materials for glass) in the crucible to melt (Step 1004). Bubbles are removed in a fining step. In some cases, fining agents are added to facilitate fining (Step 1005). Molten glass flows into the nozzle and is heated by a nozzle kiln (Step 1006). Molten glass flows out of nozzle and is selectively deposited to form a 3D object. In some cases, the deposition of glass is layer-by-layer. In addition, in some cases, glass is dribbled over an edge such that it descends to a lower layer than the current layer (Step 1007). An annealing chamber heats the 3D object, such that the temperature of the 3D object is maintained at or above a target temperature while the 3D object is being built by deposition of molten glass. After the deposition of glass is complete, the temperature in the annealing chamber is slowly lowered, such that the glass anneals (Step 1008). In some cases, the glass is polished or undergoes other post-annealing steps (Step 1009).

Figure 10B:
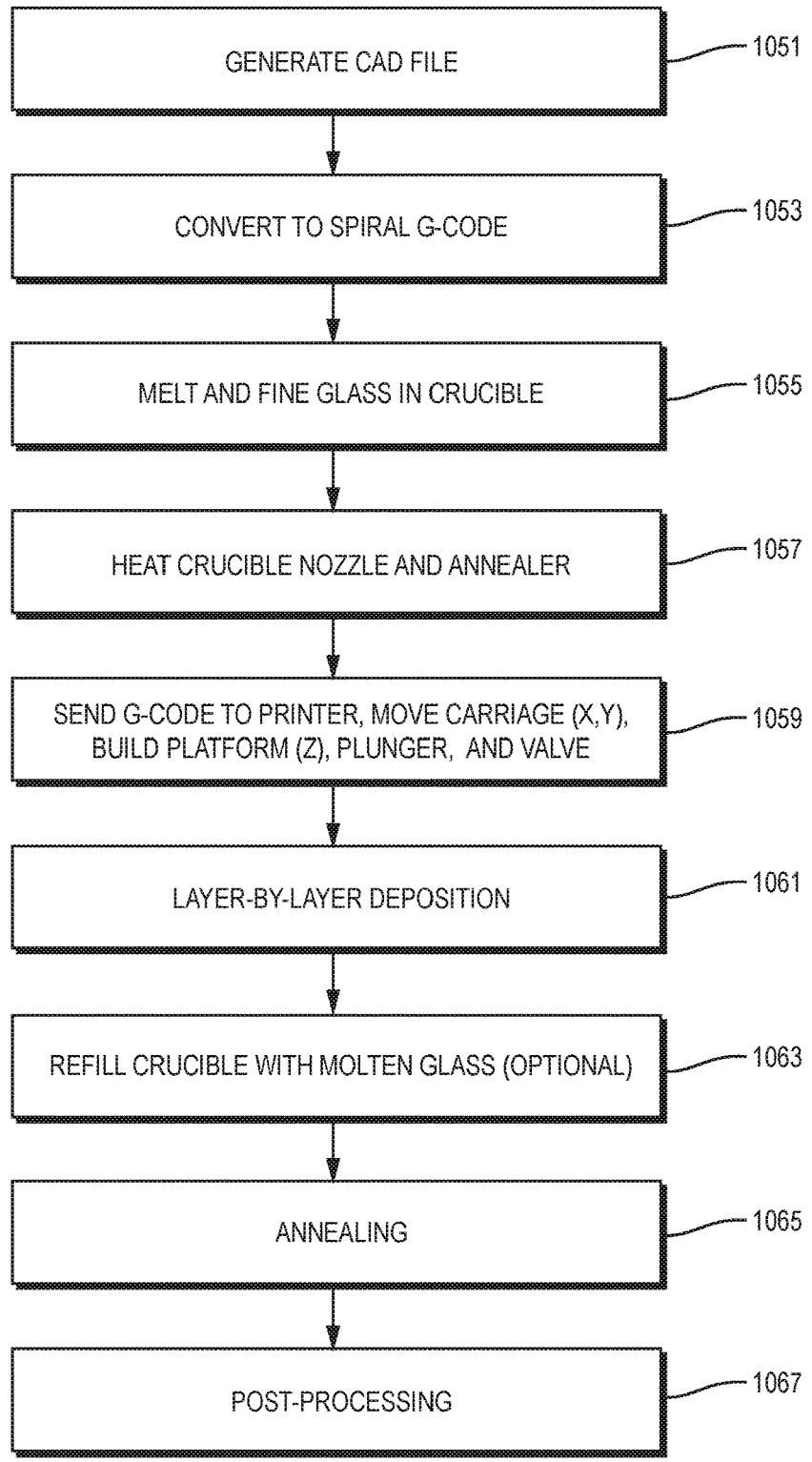
FIG. 10B is a flowchart that shows steps in a method for additive manufacture of glass.

FIG. 10B is a flowchart that shows steps in another method for additive manufacture of glass, in an illustrative implementation of this invention. The method shown in FIG. 10B includes the following steps: Generate a CAD file (Step 1051). Convert the CAD file to spiral g-code (Step 1053). Melt and fine glass in a crucible (Step 1055). Heat the crucible nozzle and annealing chamber, e.g., to 1850° F. and 900° F., respectively (Step 1057). Send g-code instructions to the printer. In accordance with the g-code instructions, move the carriage (on which the print head is mounted) in x, y directions, and move the build platform in a z direction. In some cases, move a plunger or valve (Step 1059). The print head deposits molten glass layer by layer (Step 1061). Optionally, refill the crucible with molten glass (e.g., by loading solid glass nuggets into the crucible and then melting the nuggets) (Step 1063). Anneal the glass, by slowly lowering the temperature of the glass (Step 1065). Perform post-processing steps, including removing the printed 3D glass object from the annealing chamber and, in some cases, polishing the exterior of the glass (Step 1067).

In some implementations of this invention, the extrusion of molten glass through the nozzle is actuated only by gravitational force, and the rate of extrusion is controlled by factors such as the temperature and material composition of the glass.

However, in some implementations, it is advantageous to actively exert pressure against the molten glass, in order to increase the extrusion rate for a given temperature or material composition of glass. Furthermore, by varying the pressure exerted against the molten glass, the rate of extrusion of the molten glass may be controlled, while (in some cases) holding other factors (such as temperature or material composition of glass) constant.

FIG. 11A is a cross-sectional view of an apparatus, in which a plunger exerts pressure that actively extrudes molten glass through a nozzle, in an illustrative implementation of this invention. In FIG. 11A, a refractory plunger 1103 pushes molten glass 103 in the crucible 105 into the nozzle 125 at a controlled rate. In some cases, the plunger is actuated via lead screw 1101 by plunger motor 926. Alternatively, in some cases: (a) plunger 1103 is pneumatically actuated by compressed air pumped by air pump 929; and (b) the air pump 929 pumps air at a constant or variable flow rate or at a constant or variable pressure. In some cases, the plunger motor 926 or air pump 929 is affixed to the top lid of the crucible kiln and is controlled by one or more computers. For example, in some cases, the plunger motor 926 is controlled by driver circuit 925 that is in turn controlled by microcontrollers 904 (such as an Arduino® board and shield), which are in turn controlled by a computer (e.g., 900); and (b) the computer 900 outputs g-codes that include instructions for the movement of the plunger 1103.

FIG. 11B is a cross-sectional view of an apparatus, in which air exerts pressure that actively extrudes molten glass through a nozzle, in an illustrative implementation of this invention. In FIG. 11B, air pump 929 pumps compressed air through tubes 1151, 1153 into a pressurized chamber inside the walls 1111 of the crucible 105. The compressed air 1155 exerts pressure on the molten glass 103, pushing the molten glass 103 through the nozzle 125 at a controlled rate. The air pump 929 pumps air at a constant or variable flow rate or at a constant or variable pressure.

Figure 12A:
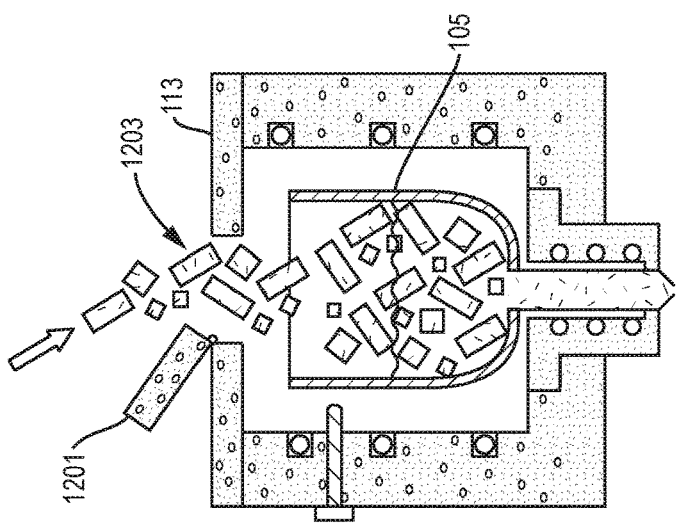
Figure 12B:
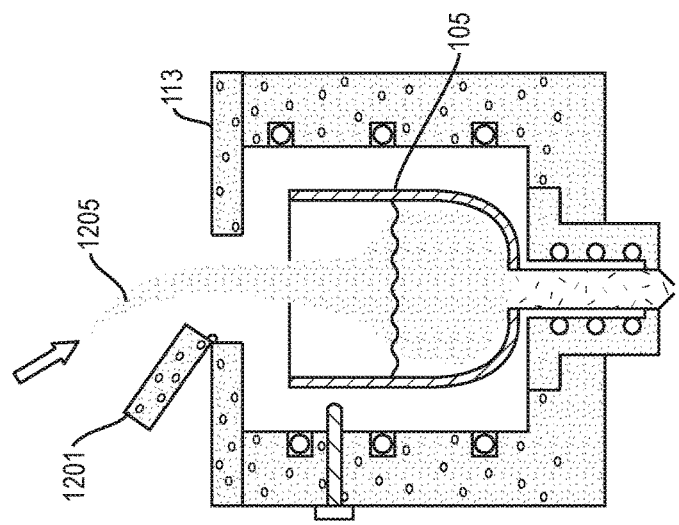
Figure 12C:
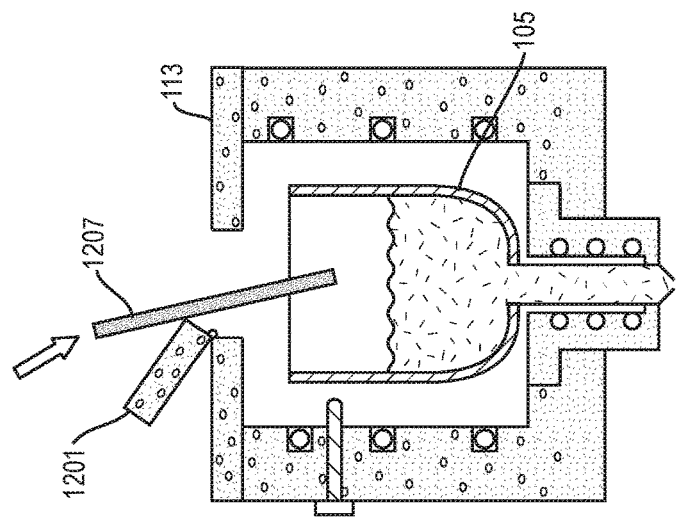

FIGS. 12A, 12B, 12C, 12D, 12E and 12F each show material being fed into a printer, in an illustrative implementation of this invention. In FIGS. 12A, 12B, 12C, 12D, and 12F, materials are inserted into crucible 105. In FIG. 12E, materials are inserted into nozzle 125. In FIGS. 12A, 12B, 12C, 12D, 12E and 12F, the materials being fed into the printer comprise, respectively: (a) solid glass nuggets 1203, (b) glass powder or raw materials for glass 1205, (c) a glass rod 1207, (d) a solid ingot 1208, (d) a molten, bubble-free glass filament 1209 that has already been melted and fined (e.g., by another kiln), and (e) molten, bubble-free glass 1210 that has already been melted and fined by another kiln. In the examples shown in FIGS. 12A, 12B, 12C, and 12F, the upper lid 113 of the crucible kiln includes a door 1201 through which the materials are inserted.

In some cases, the materials are inserted manually. Alternatively, in some cases, a feeder motor 931 actuates a feeder mechanism that feeds the materials into the crucible or nozzle. For example, in some cases, the feeder mechanism comprises any material handling system, including any vibrating feeder, rotary feeder, rotary screw feeder, variable rate feeder, or volumetric feeder.

In some cases, raw materials for glass 1205 are fed into crucible 105. For example, in some cases, the raw materials comprise a combination of materials selected from: oxides (e.g., $SiO_2$, $B_2O_3$, or $P_2O_3$), silicate sands, feldspars (e.g. albite, anorthite, aplite), borax, dolomite, limestone, nepheline, kyanite, sand, soda ash, or recycled glass. In some cases, the raw materials also include one or more (a) fluxes to reduce melting temperature (e.g., $Na_2O$, PbO, $K_2O$, $Li_2O$), (b) property modifiers to control material properties such as durability, expansion, or viscosity (e.g., CaO, $Al_2O_3$), (c) colorants, or (d) fining agents (such as As-oxides, Sb-oxides, $KNO_3$, $NaNO_3$, NaCl, fluorides, or sulfates).

In some cases, it is advantageous to quickly refill the crucible or nozzle with already molten and fined glass, as shown in FIGS. 12E and 12F, thereby skipping the time delay of melting and fining the glass in the print head itself.

In some cases, it is advantageous for the printer (a) to extrude a molten glass filament that surrounds an air-filled cavity, where the cavity extends for at least a portion of the length of the filament, or (b) to otherwise extrude blown glass. In illustrative implementations, coaxial infiltration of air into a molten glass filament facilitates hollow object fabrication.

Figure 13:
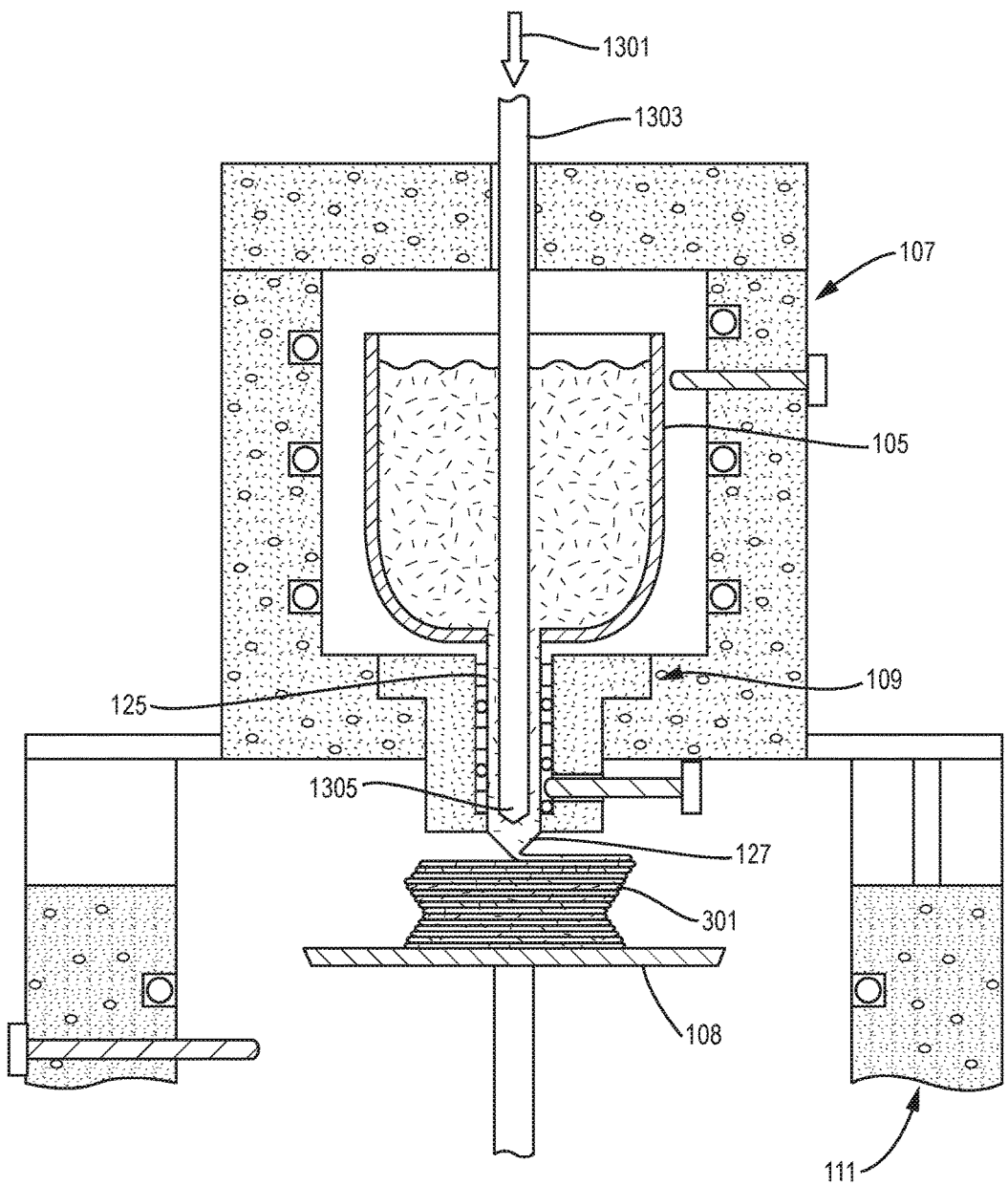
FIG. 13 is a cross-sectional view of an apparatus, in which an air tube blows air into molten glass.

FIG. 13 is a cross-sectional view of an apparatus, in which an air tube blows air into molten glass, in an illustrative implementation of this invention. The apparatus shown in FIG. 3 achieves coaxial air infiltration, as the molten glass is extruded through a nozzle.

In the example shown in FIG. 13, air pump 929 pumps air 1301 through a refractory tube 1303 that extends into nozzle 125. Tube 1303 is hollow, so that air may flow through it. A motor 928 controls vertical position of the refractory tube 1303, by actuating motion of the tube 1303 up and down. During air blowing, the tip 1305 of refractory tube 1303 is positioned almost at the tip 127 of nozzle 125. By varying tube height (i.e., how far the tip 1305 of tube 1303 is above tip 127 of nozzle 125) and air pressure, the thickness of the resulting elongated cavity of air inside the extruded glass is controlled. In some cases, refractory tube 1303 comprises quartz, mullite, or AZS (alumina-zirconia-silica).

In illustrative implementations of this invention, the printer produces optically transparent glass. In some implementations, the production of optically transparent glass includes one of more of the following features: (a) starting from large (and, in some cases, pre-fined) glass chunks to limit bubble amount; (b) fining glass for at least 2 hours (and in some cases, between 3 or 4 hours) to reduce bubble content; (c) extruding viscous molten glass, instead of sintering a powder; (d) depositing a molten glass filament with no vertical offset between the top of the layer of glass being deposited and the nozzle (instead of positioning the nozzle above the layer being deposited, and thereby causing the extruded filament to drop before reaching the level of the layer being deposited); (e) annealing the extruded glass in an annealing chamber; and (f) polishing the exterior surface (including base and walls) of the 3D printed glass object, after the glass cools to room temperature.

In illustrative implementations, the 3D printer selectively deposits molten glass. This allows the 3D printer to create shapes that cannot be fabricated by conventional glassblowing or by a conventional manufacturing technique in which a parison is blow molded.

Figure 14A:
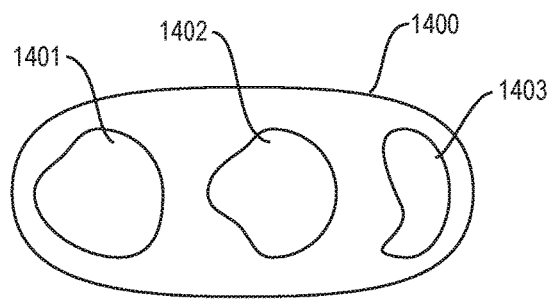
FIGS. 14A, 14B, 14C and 14D show non-limiting examples of glass objects printed by a 3D printer.
Figure 14B:
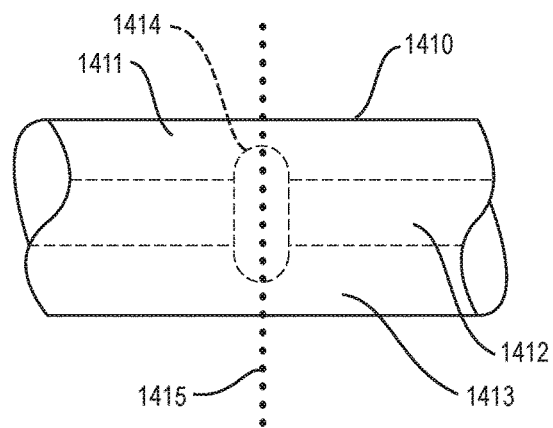
Figure 14C:
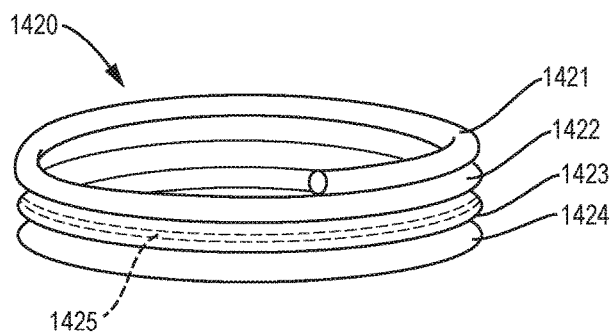
Figure 14D:
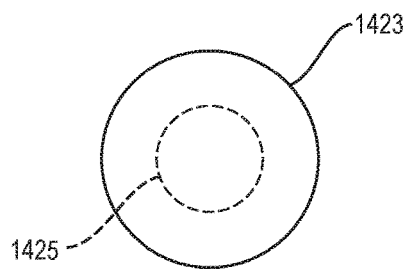

FIGS. 14A, 14B, 14C and 14D show non-limiting examples of glass objects printed by a 3D printer (e.g., objects 1400, 1410, 1420), in illustrative implementations of this invention. In the example shown in FIG. 14A, a printed glass object 1400 is an integral structure that has multiple, separate internal cavities 1401, 1402, 1403; and (b) each of the cavities has a volume of at least 40 milliliters and is entirely enclosed by the glass. In the example shown in FIG. 14B, the printed glass object 1410 includes multiple layers (e.g., 1411, 1412, 1413) of optically transparent glass. The layers (e.g., 1411, 1412, 1412) partially merge into each other vertically. In the example shown in FIG. 14B, the layers (e.g., 1411, 1412, 1413) are part of a single spiral filament, and thus are also connected to each other along a path that follows the long, spiral central axis of the spiral filament. The glass object 1410 also includes an elongated protuberance 1414 that is located on an exterior surface of the structure, and comprises a solidified drip of glass. The protuberance 1414 is elongated along an axis 1415 that is aligned vertically. In the example shown in FIG. 14C, a printed glass object 1420 is a unitary structure that includes a spiral filament 1421 of optically transparent glass. The spiral filament 1421 forms multiple layers (e.g., 1422, 1423, 1424), one layer on top of another. The layers partially merge into each other. The spiral filament 1421 has an elongated cavity 1425 that is entirely enclosed by the filament and extends for at least half of a revolution of a spiral formed by the filament. FIG. 14D is a cross-sectional view of cavity 1425.

In FIGS. 7, 8A, 8B, 11A, 11B, 12A-12F, one or both of temperature sensors 128, 141 are not shown, but are actually present in apparatus shown in those Figures.

Crucible and nozzle materials and shapes may be varied, depending on the particular implementation of this invention. For example, in some cases, a wide elongated crucible allows refilling farther from the nozzle with less impact on pressure head and consequently on flow rate.

In some implementations, the skirt insulation system (e.g., 701, 703) is replaced by a bellow system.

In illustrative implementations of this invention, the glass comprises a glass material, as that term is defined herein. Thus, in illustrative implementations of this invention, glass material is melted in a crucible 105, extruded through a nozzle 125, and selectively deposited (layer-by-layer or otherwise) to form a 3D object that comprises glass material.

In illustrative implementations of this invention, the glass comprises an amorphous material, as that term is defined herein. Thus, in illustrative implementations of this invention, an amorphous material is melted in a crucible 105, extruded through a nozzle 125, and selectively deposited (layer-by-layer or otherwise) to form a 3D object that comprises amorphous material.

Field of Endeavor

The field of endeavor of this invention is additive manufacturing of glass, by extrusion of molten glass through a nozzle.

The inventors confronted at least the following two problems: (1) how to additively manufacture a glass object by selective deposition of molten glass by extrusion through a nozzle; and (2) how to additively manufacture an optically transparent glass object, by selective deposition of molten glass by extrusion through a nozzle.

Computers

In exemplary implementations of this invention, one or more electronic computers (e.g. 900, 904) are programmed and specially adapted: (1) to control the operation of, or interface with, hardware components of an apparatus for additive manufacture of glass, including any heating elements, motors, actuators, valves, thermocouples or other sensors; (2) to control movement of a print head or build platform; (3) to control temperature in the interior of a kiln, including a crucible kiln, nozzle kiln or annealing kiln, (4) to perform any other calculation, computation, program, algorithm, computer function or computer task described or implied above; (5) to receive signals indicative of human input; (6) to output signals for controlling transducers for outputting information in human perceivable format; and (7) to process data, to perform computations, to execute any algorithm or software, and to control the read or write of data to and from memory devices. The one or more computers may be in any position or positions within or outside of the additive manufacturing apparatus. For example, in some cases (a) at least one computer is housed in or together with other components of the additive manufacturing apparatus, and (b) at least one computer is remote from other components of the additive manufacturing apparatus. The one or more computers are connected to each other or to other components of the additive manufacturing apparatus either: (a) wirelessly, (b) by wired connection, or (c) by a combination of wired and wireless links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, computer function or computer task described or implied above. For example, in some cases, instructions encoded in a tangible, non-transitory, computer-accessible medium comprise instructions for a computer to: (1) to control the operation of, or interface with, hardware components of an apparatus for additive manufacturing of glass, including any heating elements, motors, actuators, valves, thermocouples or other sensors; (2) to control movement of a print head or build platform; (3) to control temperature in the interior of a kiln, including a crucible kiln, nozzle kiln or annealing kiln, (4) to perform any other calculation, computation, program, algorithm, computer function or computer task described or implied above; (5) to receive signals indicative of human input; (6) to output signals for controlling transducers for outputting information in human perceivable format; and (7) to process data, to perform computations, to execute any algorithm or software, and to control the read or write of data to and from memory devices.

Network Communication

In illustrative implementations of this invention, one or more electronic devices (e.g., 900, 904, 914, 917, 920, 925, 927, 930) are configured for wireless or wired communication with other electronic devices in a network.

In some cases, one or more of the following hardware components are used for network communication: a computer bus, a computer port, network connection, network interface device, host adapter, wireless module, wireless card, signal processor, modem, router, computer port, cables or wiring.

In some cases, one or more computers (e.g., 900, 904) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

In some cases, one or more electronic devices in the additive manufacturing apparatus include a wireless communication module for wireless communication with other electronic devices in a network. Each wireless communication module includes (a) one or more antennas, (b) one or more wireless transceivers, transmitters or receivers, and (c) signal processing circuitry. The wireless communication module receives and transmits data in accordance with one or more wireless standards.

Definitions:

The terms "a" and "an", when modifying a noun, do not imply that only one of the noun exists.

"Amorphous material" means a material that (a) has a non-crystalline atomic structure when solid and (b) exhibits a glass transition when cooling toward the amorphous material's glass transition temperature. As used herein, an "amorphous material" remains an amorphous material, regardless of temperature (e.g., above or below glass transition temperature) or phase (e.g., solid or liquid).

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Contain" shall be construed as if followed by "without limitation". If A contains B, then A contains B and may contain other things. To "contain" does not require total enclosure. For example, a container "contains" a fluid within a cavity formed by the container's walls, even if hole in a container wall creates an orifice connecting the cavity and the external environment.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

An "exit orifice" of a nozzle means an orifice through which a fluid or other material exits the nozzle.

A non-limiting example of "extrusion" is flow of molten glass through a nozzle, which flow is actuated only by gravitational force.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"Fluid" means a gas or a liquid.

The term "for instance" means for example.

"Glass material" means a material that comprises, when solid: (a) silicate glass, (b) borate glass, (c) phosphate glass, (d) fluoride glass, or (e) chalcogenide glass. As used herein, "glass material" remains glass material, regardless of temperature (e.g., above or below glass transition temperature) or phase (e.g., solid or liquid).

Non-limiting examples of a "heating element" include a resistive heating element and an inductive heater.

"Herein" means in this document, including text, specification, claims, abstract, and drawings.

The term "hole" means a hole, cavity, gap, opening or orifice.

The terms "horizontal" and "vertical" shall be construed broadly. For example, in some cases, the terms "horizontal" and "vertical" refer to two arbitrarily chosen coordinate axes in a Euclidian two dimensional space, regardless of whether the "vertical" axis is aligned with the orientation of the local gravitational field.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"I/O device" means an input/output device. For example, an I/O device includes any device for (a) receiving input from a human, (b) providing output to a human, or (c) both. For example, an I/O device includes a user interface, graphical user interface, keyboard, mouse, touch screen, microphone, handheld controller, display screen, speaker, or projector for projecting a visual display. Also, for example, an I/O device includes any device (e.g., button, dial, knob, slider or haptic transducer) for receiving input from, or providing output to, a human.

A non-limiting example of "layer-by-layer" deposition is to deposit flat, separate layers, one on top of another. A non-limiting example of "layer-by-layer" deposition is to deposit a filament in a spiral as shown in FIG. 14C, where layers 1422, 1423 and 1424 are all portions of the same filament 1421, and layer 1422 rests on top of layer 1423 which in turn rests on top of layer 1424. Another non-limiting example of "layer-by-layer" deposition is to deposit a filament such that the filament bends in a non-spiral shape, such that a first portion of the filament rests on a second portion of the filament, and the second portion of the filament rests on a third portion of the filament.

As used herein: (a) to say that a glass material is "molten" means that the temperature of the glass material is above the glass transition temperature of the glass material; (b) to say that an amorphous material is "molten" means that the temperature of the amorphous material is above the glass transition temperature of the amorphous material; and (c) to say that glass is "molten" means that the temperature of the glass is above the glass transition temperature of the glass. As used herein: (a) to say that a glass material "melts" means that the glass material undergoes a glass transition as the temperature of the glass material increases; (b) to say that an amorphous material "melts" means that the amorphous material undergoes a glass transition as the temperature of the amorphous material increases; and (c) to say that glass "melts" means that the glass undergoes a glass transition as the temperature of the glass increases.

As used herein, "nozzle" means any orifice through which material (such as molten glass, gas, liquid, fluid, or solid) passes. A nozzle may have any shape. For example, in some cases, a nozzle may have a shape that does not accelerate material the as the material exits the nozzle.

To say that glass material is "optically transparent" means that the glass material is transparent to light in the visible light spectrum. To say that amorphous material is "optically transparent" means that the amorphous material is transparent to light in the visible light spectrum. To say that glass is "optically transparent" means that the glass is transparent to light in the visible light spectrum.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

To say that a nozzle "selectively deposits" material does not have any implication regarding whether the rate of flow of the material varies over time.

As used herein, the term "set" does not include a group with no elements. Mentioning a first set and a second set does not, in and of itself, create any implication regarding whether or not the first and second sets overlap (that is, intersect).

Non-limiting examples of "silicate glass" include fused quartz glass, soda-lime-silica glass, sodium borosilicate glass (including Pyrex® glass), lead-oxide glass, and aluminosilicate glass.

"Some" means one or more.

As used herein, a "subset" of a set consists of less than all of the elements of the set.

"Substantially" means at least ten percent. For example: (a) 112 is substantially larger than 100; and (b) 108 is not substantially larger than 100.

The term "such as" means for example.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses. In each case described in this paragraph, Applicant is acting as Applicant's own lexicographer.

Variations:

This invention may be implemented in many different ways. Here are some non-limiting examples:

In one aspect, this invention is a method that comprises, in combination: (a) heating of glass material such that the glass material becomes or remains molten; and (b) deposition of the molten glass material, in which the molten glass material is extruded through a nozzle to form an object; wherein during at least part of the deposition, (i) the object being formed rests on a build platform, (ii) the molten glass material is deposited layer-by-layer; and (iii) one or more computers control where in each layer the molten glass material is deposited, by controlling a set of actuators that actuate movement of one or both of the nozzle and build platform. In some cases, at least one actuator, out of the set of actuators, directly or indirectly actuates the nozzle to move along at least one horizontal axis. In some cases: (a) the heating occurs in a kiln; (b) during the deposition, a first actuator, out of the set of actuators, actuates the kiln and the nozzle to move along a first horizontal axis; and (c) during the deposition, a second actuator, out of the set of actuators, actuates the kiln and the nozzle to move along a second horizontal axis, the first and second horizontal axes being perpendicular to each other. In some cases, during the deposition: (a) a first actuator, out of the set of actuators, actuates the nozzle to move along a horizontal axis; and (b) a second actuator, out of the set of actuators, actuates the build platform to rotate. In some cases: (a) during the deposition, the build platform is positioned inside an annealing kiln; and (b) after the deposition, the annealing kiln anneals extruded glass material. In some cases, extrusion of the molten glass material through the nozzle is actuated by gravitational force and is not actuated by any other net mechanical force. In some cases, during the deposition: (a) the nozzle is stationary relative to a wall of the annealing kiln; and (b) at least one actuator, out of the set of actuators, actuates the build platform to cause the build platform to move relative to the nozzle and the wall. In some cases: (a) an exit portion of the nozzle surrounds or is adjacent to an exit orifice of the nozzle; (b) the method further comprises cooling the exit portion of the nozzle by causing fluid to flow through a region that adjoins the exit portion; and (c) the fluid is cooler than molten glass material exiting the exit orifice. Each of the cases described above in this paragraph is an example of the method described in the first sentence of this paragraph, and is also an example of an embodiment of this invention that may be combined with other embodiments of this invention.

In another aspect, this invention is an apparatus comprising, in combination: (a) a build platform; (b) one or more heating elements for heating of glass material, such that the glass material becomes or remains molten; (c) a nozzle for deposition of the molten glass material, such that the molten glass material is extruded through the nozzle to form an object that rests on the build platform; (d) a set of actuators; and (e) one or more computers for controlling the deposition, such that, during at least a portion of the deposition (i) the molten glass material is deposited layer-by-layer; and (ii) the one or more computers control where in each layer the molten glass material is deposited, by causing the set of actuators to actuate movement of one or both of the nozzle and build platform. In some cases, at least one actuator, out of the set of actuators, is configured to actuate the nozzle to move along at least one horizontal axis. In some cases: (a) a first actuator, out of the set of actuators, is configured to actuate the nozzle and at least some of the heating elements to move parallel to a first horizontal axis; and (b) a second actuator, out of the set of actuators, is configured to actuate the nozzle and at least some of the heating elements to move parallel to a second horizontal axis, the first and second horizontal axes being perpendicular to each other. In some cases: (a) a first actuator, out of the set of actuators, is configured to actuate the nozzle to move parallel to a horizontal axis; and (b) a second actuator, out of the set of actuators, is configured to actuate the build platform to rotate. In some cases: (a) the build platform is positioned inside a kiln; and (b) the kiln is configured to anneal extruded glass material. In some cases, the apparatus includes a valve for controlling flow of molten glass material through the nozzle. In some cases: (a) the nozzle is stationary relative to a wall of the kiln; and (b) at least one actuator, out of the set of actuators, is configured to actuate the build platform such that the build platform moves relative to the nozzle and the wall. In some cases: (a) an exit portion of the nozzle surrounds or is adjacent to an exit orifice of the nozzle; and (b) the apparatus further comprises one or more tubes or cavities adjacent to the exit portion, which tubes or cavities are configured to cool the exit portion when fluid cooler than the molten glass material flows through the tubes or cavities. Each of the cases described above in this paragraph is an example of the apparatus described in the first sentence of this paragraph, and is also an example of an embodiment of this invention that may be combined with other embodiments of this invention.

In another aspect, this invention is an apparatus comprising: (a) heating elements for heating glass material, such that the glass material becomes or remains molten; (b) a nozzle for extruding the molten glass material; (c) tubes or chambers that are adjacent to a tip of the nozzle; (d) a pump for pumping fluid through the tubes or chamber to cool the tip of the nozzle to a temperature that is less than temperature of the molten glass material; (e) a set of actuators; and (f) a set of computers that is programmed to control the set of actuators such that the set of actuators actuate movement of one or both of the nozzle and build platform during the extruding, such that extruded molten glass material forms an object in accordance with digital instructions accessed or generated by at least one computer, out of the set of computers. In some cases, the apparatus further comprises a kiln for annealing the molten glass material. In some cases: (a) a first actuator, out of the set of actuators, is configured to actuate the nozzle and at least some of the heating elements to move parallel to a first horizontal axis; and (b) a second actuator, out of the set of actuators, is configured to actuate the nozzle and at least some of the heating elements to move parallel to a second horizontal axis, the first and second horizontal axes being perpendicular to each other. In some cases: (a) a first actuator, out of the set of actuators, is configured to actuate the nozzle to move parallel to a horizontal axis; and (b) a second actuator, out of the set of actuators, is configured to actuate the build platform to rotate. Each of the cases described above in this paragraph is an example of the apparatus described in the first sentence of this paragraph, and is also an example of an embodiment of this invention that may be combined with other embodiments of this invention.

In another aspect, this invention comprises an article of manufacture that comprises an integral structure, which integral structure has multiple, separate internal cavities, such that each of the cavities has a volume of at least 40 milliliters and is entirely enclosed by the glass material. In some cases, the integral structure includes layers of optically transparent glass material, such that adjacent layers partially merge into each other. In some cases, the integral structure further comprises an elongated protuberance, which protuberance: (a) is located on an exterior surface of the structure; and (b) comprises a solidified drip of glass material. In some cases, the protuberance is elongated along an axis that is aligned vertically. Each of the cases described above in this paragraph is an example of the article of manufacture described in the first sentence of this paragraph, and is also an example of an embodiment of this invention that may be combined with other embodiments of this invention.

In another aspect, this invention comprises an article of manufacture that comprises a unitary structure, wherein: (a) the unitary structure includes a spiral filament of optically transparent glass material; (b) the spiral filament forms multiple layers, one layer on top of another, which layers are part of the spiral filament and partially merge into each other vertically; and (c) the spiral filament has an elongated cavity that is entirely enclosed by the filament and extends for at least half of a revolution of a spiral formed by the filament. The article of manufacture described in the first sentence of this paragraph may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed is:

1. An apparatus comprising:
   (a) a crucible kiln that includes heating elements;
   (b) a nozzle;
   (c) an annealing kiln;
   (d) a build platform that is located inside the annealing kiln; and
   (e) a set of actuators that are configured (1) to cause the crucible kiln and the nozzle to move horizontally relative to the annealing kiln while the crucible kiln and the nozzle remain stationary relative to each other, and (2) to cause the build platform to move vertically relative to the nozzle;
   wherein
   (i) the heating elements of the crucible kiln are configured to melt and fine glass material in the crucible kiln, to produce a molten glass material,
   (ii) the crucible kiln is positioned above and exterior to the annealing kiln, and
   (iii) the apparatus is configured to cause the molten glass material to undergo an extruding, in which the molten glass material is extruded through the nozzle to form an object, in such a way that
      (A) the molten glass material is, while exiting the nozzle, located inside the annealing kiln, and
      (B) during the extruding
         (I) temperature in the crucible kiln is higher than temperature in the annealing kiln,
         (II) the object being formed rests on the build platform inside the annealing kiln, and
         (III) the molten glass material travels downward from the crucible kiln, through the nozzle, and into the annealing kiln.

2. The apparatus of claim 1, wherein the apparatus is configured to cause the molten glass material to be deposited layer-by-layer to form the object.

3. The apparatus of claim 1, wherein:
   (a) a first actuator, out of the set of actuators, is configured to actuate the kiln and the nozzle to move along a horizontal axis;
   (b) a second actuator, out of the set of actuators, is configured to actuate the build platform to rotate; and
   (c) a third actuator, out of the set of actuators, is configured to actuate the build platform to move along a vertical axis.

4. The apparatus of 1, wherein the annealing kiln is configured to anneal extruded glass material.

5. The apparatus of claim 1, wherein the extruding of the molten glass material through the nozzle is actuated by gravitational force and is not actuated by any other net force.

6. The apparatus of claim 1, wherein:
   (a) a region of the nozzle surrounds a nozzle tip of the nozzle; and
   (b) the apparatus is configured to cause the region to undergo cooling, by circulating fluid through the region.

7. The apparatus of claim 6, wherein an effect of the cooling is that less glass material sticks to the nozzle tip than would stick to the nozzle tip in the absence of the cooling.

8. The apparatus of claim 1, wherein:
   (a) the apparatus further comprises tubes or cavities that surround a nozzle tip of the nozzle; and
   (b) the apparatus is configured to cause the tubes or cavities to undergo cooling, by circulating fluid through the tubes or cavities.

9. The apparatus of claim 8, wherein an effect of the cooling is that less glass material sticks to the nozzle tip than would stick to the nozzle tip in the absence of the cooling.

10. The apparatus of claim 1, further comprising a valve that is configured to control flow of molten glass material through the nozzle.

11. The apparatus of claim 10, wherein the valve comprises a pair of shears that are configured to close in such a way that closing the shears:
    (a) cuts a filament of the molten glass material that is exiting the nozzle, and
    (b) blocks the flow of the molten glass material through an exit orifice of the nozzle.

12. The apparatus of claim 10, wherein:
    (a) the valve comprises a rod; and
    (b) the rod is configured to stop the when the rod is moved into the nozzle and touches interior walls of the nozzle.

13. The apparatus of claim 1, further comprising a plunger that is configured to:
    (a) exert pressure on the molten glass material; and
    (b) thereby push the molten glass material through the nozzle.

14. The apparatus of claim 1, wherein:
(a) the apparatus further comprises an air pump and tubes; and
(b) the air pump is configured to pump air through the tubes, in such a way that the air exerts pressure on the molten glass material and thereby pushes the molten glass material through the nozzle.

15. The apparatus of claim 1, wherein
(a) the apparatus further comprises an air pump and a tube; and
(b) the air pump is configured to pump air through the tube, in such a way that
  (i) a column of air infiltrates a filament of the molten glass material as the filament is extruded through the nozzle, and
  (ii) the column of air is trapped inside the filament and is co-axial with the filament.

16. The apparatus of claim 1, wherein the object that is formed is optically transparent.

\* \* \* \* \*